US010281587B2

(12) United States Patent
Drescher et al.

(10) Patent No.: US 10,281,587 B2
(45) Date of Patent: May 7, 2019

(54) NAVIGATION SATELLITE SYSTEM POSITIONING INVOLVING THE GENERATION OF CORRECTION INFORMATION

(71) Applicant: Trimble Inc., Sunnyvale, CA (US)

(72) Inventors: Ralf Drescher, Höhenkirchen-Siegertsbrunn (DE); Xiaoming Chen, Höhenkirchen-Siegertsbrunn (DE)

(73) Assignee: Trimble Inc., Sunnyvale, CA (US)

( * ) Notice: Subject to any disclaimer, the term of this patent is extended or adjusted under 35 U.S.C. 154(b) by 628 days.

(21) Appl. No.: 15/002,247

(22) Filed: Jan. 20, 2016

(65) Prior Publication Data
US 2016/0377730 A1 Dec. 29, 2016

(30) Foreign Application Priority Data

Dec. 16, 2014 (EP) ..................................... 14198216

(51) Int. Cl.
*G01S 19/40* (2010.01)
*G01S 19/07* (2010.01)
(Continued)

(52) U.S. Cl.
CPC ............. *G01S 19/40* (2013.01); *G01S 19/07* (2013.01); *G01S 19/13* (2013.01); *G01S 19/44* (2013.01)

(58) Field of Classification Search
CPC .......... G01S 19/40; G01S 19/07; G01S 19/13; G01S 19/44; G01S 19/42; G01S 19/09; G01S 19/48; G01S 19/05
(Continued)

(56) References Cited

U.S. PATENT DOCUMENTS

2009/0224969 A1* 9/2009 Kolb ....................... G01S 19/04
342/357.27
2011/0109503 A1 5/2011 Henkel et al.
(Continued)

FOREIGN PATENT DOCUMENTS

EP 2 746 811 A2 6/2014
EP 3 035 080 A1 6/2016
(Continued)

OTHER PUBLICATIONS

Leandro, R. et al., "Developments on Global Centimeter-level Gnss Positioning with Trimble CenterPoint RTX™," Proceedings of the 25th International Technical Meeting of the Satellite Division of the Institute of Navigation, Nashville, USA, Sep. 2012, pp. 3089-3096.
(Continued)

Primary Examiner — Harry K Liu
(74) Attorney, Agent, or Firm — Kilpatrick Townsend & Stockton LLP

(57) ABSTRACT

The invention relates to generating correction information to be used to correct observations coming from a navigation satellite system (NSS) receiver in a region of interest. For each of a plurality of reference stations in said region, raw observations obtained by the reference station observing NSS multiple-frequency signals from a plurality of satellites over multiple epochs are received. Then, precise satellite information on the orbit position, clock offset, and biases of each satellite is obtained. For each reference station, ambiguities in the carrier phase of the received raw observations are estimated, using the precise satellite information and the position coordinates of the reference station. Geometric-free phase linear combination values are then computed based on the received raw observations together with the estimated ambiguities. The correction information is generated based on the computed geometric-free phase linear combination values. The correction information comprises, for each NSS (Continued)

satellite, a regional ionospheric delay function and its coefficients, those representing, per NSS satellite, the ionospheric delay in said region. The correction information is sent, for example to facilitate position determination, to the NSS receiver or to a server in charge of processing observations from the NSS receiver.

17 Claims, 8 Drawing Sheets

(51) Int. Cl.
    *G01S 19/13*     (2010.01)
    *G01S 19/44*     (2010.01)

(58) Field of Classification Search
    USPC .................................................. 342/357.23
    See application file for complete search history.

(56) References Cited

U.S. PATENT DOCUMENTS

| | | | |
|---|---|---|---|
| 2011/0205116 A1* | 8/2011 | Fujisawa | G01S 19/32 342/357.77 |
| 2012/0286991 A1 | 11/2012 | Chen et al. | |
| 2013/0044026 A1* | 2/2013 | Chen | G01S 19/07 342/357.27 |
| 2014/0292573 A1 | 10/2014 | Drescher et al. | |
| 2015/0338520 A1* | 11/2015 | Boriskin | G01S 19/13 342/357.51 |

FOREIGN PATENT DOCUMENTS

| | | |
|---|---|---|
| WO | 2010/021660 A2 | 2/2010 |
| WO | 2011/034614 A2 | 3/2011 |
| WO | 2011/034616 A2 | 3/2011 |
| WO | 2011/100680 A2 | 8/2011 |
| WO | 2011/100690 A2 | 8/2011 |
| WO | 2011/126605 A2 | 10/2011 |

OTHER PUBLICATIONS

Ohashi, M. et al., "Prediction of Regional Ionoshperic Delays with Spherical Cap Harmonic Analysis and Regression Models," Proceedings of the Institute of Navigation Pacific PNT 2013, pp. 336-343.
Drescher, R. et al., "Accelerating the Convergence of Trimble CenterPoint RTX Positioning by using a Global Ionospheric Model," GNSS PPP Workshop: Reaching Full Potention, Ottawa, Canada, Jun. 12-14, 2013, 21 pages.
Mannucci, A. et al., "A New Method for Monitoring the Earth's Ionospheric Total Electron Content Using the GPS Global Network," Proceedings of the $6^{th}$ International Technical Meeting of the Satellite Division of the Institute of Navigation, (ION GPS1993), Sep. 22-24, Salt Lake City, Utah, Sep. 1993, pp. 1323-1332.
Joosten, P. et al., "Fixing the Ambiguities—Are You Sure They're Right?" GPS World, 11(5), May 2000, 6 pages.
Schaer, S., "Mapping and Predicting the Earth's Ionosphere Using the Global Positioning System," Dissertation, Geodatisch-geophysikalische Arbeiten in der Schweiz, (1999), vol. 59, 228 pages.
The extended European Search Report for Application No. EP 14198216.5-1812, 9 pages.
Gao, Y. et al., "Precise Point Positioning and Its Challenges," Inside GNSS, 1(8), (2006), 5 pages.
Chen, X. et al., "Trimble RTX, an Innovative New Approach for Network RTK," ION GNSS, (2011), Whitepaper, 6 pages.
De Santis, A. et al., "Regional geomagnetic field modelling: the contribution of the Istituto Nazionale di Geofisica," Annali di Geofisca, (1997), vol. XL, 5, 1161-1169.
Brown, N. et al., "RTK Rover Performance using the Master-Auxiliary Concept," Journal of Global Positioning Systems, (2006), vol. 5, No. 1-2: pp. 135-144.
Niell, A. E., "Global mapping functions for the atmosphere delay at radio wavelengths," Journal of Geophysical Research (1996), 101(62), 2. pp. 3227-3246.
Landau, H. et al., "Virtual Reference Station Systems," Journal of Global Positioning Systems, (2002), vol. 1, No. 2: pp. 137-143.
Teunissen, P., "The least-squares ambiguity decorrelation adjustment: a method for fast GPS integer ambiguity estimation," Journal of Geodesy, (1995), 70(1-2): pp. 65-82.

* cited by examiner

NAVIGATION SATELLITE SYSTEM POSITIONING INVOLVING THE GENERATION OF CORRECTION INFORMATION

CROSS-REFERENCE TO RELATED APPLICATIONS

This application claims priority to European Patent Application No. EP14198216.5, filed Dec. 16, 2014, the entire contents of which are incorporated by reference herein for all purposes.

FIELD OF TECHNOLOGY

The invention relates to global or regional navigation satellite systems (NSS) position estimation methods, devices and computer programs. The fields of application of the methods, devices and computer programs include, but are not limited to, navigation, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BeiDou (China), QZSS (Japan), and the Indian Regional Navigational Satellite System (IRNSS) (systems in use or in development). A NSS typically uses a plurality of satellites orbiting the Earth. The plurality of satellites forms a constellation of satellites. A NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of Hofmann-Wellenhof B., et al., *GNSS, Global Navigation Satellite Systems, GPS, GLONASS, Galileo, & more*, Springer-Verlag Wien, 2008, (hereinafter referred to as "reference [1]").

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimeter-level or even millimeter-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person will recognize that the same or similar principles apply to RNSS systems.

The main GNSS observables are therefore the carrier phase and code (pseudorange), the former being much more precise than the latter, but ambiguous. These observables basically enable a user to obtain the geometric distance from the receiver to the satellite. With known satellite position and satellite clock error, the receiver position can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third frequency will be available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequency is modulated with a pseudo-random number (PRN) code, and with satellite navigation data. Two different PRN codes are transmitted by each satellite: a C/A code and a P code which is encrypted for DoD-authorized users. Each C/A code is a unique sequence of 1023 bits, which is repeated each millisecond. Other NSS systems also have satellites transmitting multiple signals on multiple carrier frequencies.

FIG. 1 schematically illustrates a prior art NSS system 100. Receiver 110 receives NSS signals from any number of satellites in view, such as at 120, 130 and 140. The signals pass through the earth's ionosphere 150 and through the earth's troposphere 160. Each signal has multiple carrier frequencies, such as frequencies L1 and L2. Receiver 110 determines from the signals respective pseudo-ranges PR1, PR2, . . . , PRm, to the satellites. Pseudo-range determinations are distorted by signal-path variations resulting from passage of the signals through the ionosphere 150 and the troposphere 160, and from multipath effects, as indicated schematically at 170. Pseudo-ranges can be determined using the C/A code with an error of about one meter. However, the phases of the L1 and L2 carriers can be measured with an accuracy of 0.01 to 0.05 cycles (corresponding to pseudo-range errors of 2 mm to 1 cm). Phase measurements of the carriers are influenced by the dispersive effects of the ionosphere, which vary over time.

The processing of the phase observations leads to a much higher accuracy, which can be advantageously used for precise NSS positioning. The phase observations are ambiguous by the ambiguity term which is a product of an unknown integer number and the wavelength of the carrier signal. These unknowns could be handled by simply being estimated as float numbers within the GNSS parameter estimation. The corresponding position result is a so-called float solution. Another possibility is to fix them to their integer values by corresponding methods and introduce them in the GNSS parameter estimation. By doing so, the number of unknowns is reduced drastically and the accuracy of the positioning result, the fixed solution, is better than the float solution (as explained for example in: Joosten and Tiberius (2000): Fixing the ambiguities—are you sure they are right?, GPS world, 11(5), pp. 46-51).

Artificial observations can also be computed from the original ones by forming linear combinations. This is true both for the code and phase observations. These linear combinations have different properties compared to the original observations. Popular linear combinations include: the Melbourne-Wuebbena (MW) linear combination, the widelane linear combination, the geometric-free linear combination (also called ionospheric linear combination) and the ionospheric-free linear combination (also called geometric linear combination). Some combinations have properties that are specifically beneficial for some dedicated applications (as explained for example in: WO 2011/034616 A2, hereinafter referred to as reference [2]).

Relative positioning allows common-mode errors to be mitigated by differencing the observations of the rover station with observations of a reference station at a known location near the rover station, e.g. within 2 to 10 km. By using the network-based Real Time Kinematic (RTK) techniques, the spacing of the reference stations can be increased to 50 to 100 km.

Precise point positioning (PPP), also called absolute positioning, uses a single GNSS receiver together with precise satellite orbit and clock data to reduce satellite-related error sources. A dual-frequency receiver can remove the first-order effect of the ionosphere by using the ionospheric-free linear combination. Afterwards, position solutions are accurate in a range of centimeters to decimeters. The utility of PPP is limited by the need to wait longer than desired for the float position solution to converge to centimeter accuracy. This waiting time is called convergence time. In contrast to relative positioning techniques in which common-mode errors are reduced by differencing of observations, PPP processing uses undifferenced carrier-phase observations so that the ambiguity terms are corrupted by satellite and receiver phase biases unless the effects are modelled. Methods have been proposed for integer ambiguity resolution in PPP processing. See for example reference [2], and Y. Gao et al. (2006): Precise Point Positioning and Its Challenges, Inside GNSS, 1(8), pp. 16-18.

Embodiments described in WO 2011/034614 A2 (hereinafter referred to as reference [3]) generate synthetic base station data preserving the integer nature of carrier phase data. A set of corrections is computed per satellite (a MW-bias, a code leveled clock error and a phase leveled clock error) from global network data. Using these corrections, a rover station can use the MW-combination to determine widelane ambiguities and use ionospheric-free code/phase observations to determine the N1 (narrowlane) ambiguities. With the determined ambiguities, the rover station can achieve centimeter-level accuracy positioning in real-time. The advantage of this approach is that it is insensitive to ionospheric activity; the disadvantage is that the convergence time is longer than desired.

In order to improve the convergence time, US 2013/0044026 A1 (hereinafter referred to as reference [4]) describes a method making use of an ionosphere model and further deriving an ionospheric-phase bias per satellite in addition to other corrections (a MW-bias, a code-leveled clock error and a phase-leveled clock error) to generate synthetic base station data. The synthetic base station data generated with this approach preserves the integer nature of carrier phase data, and it can be used for both single and dual frequency rover stations. This approach requires an ionosphere model.

There is a constant need for improving the implementation of positioning systems based notably on GNSS (or RNSS) measurements, to obtain a precise estimation of the receiver position, and in particular to quickly obtain a precise estimation, so as to increase the productivity of positioning systems.

SUMMARY

The present invention aims at addressing the above-mentioned need. The invention includes methods, apparatuses, computer programs, computer program products and storage mediums as defined in the independent claims. Particular embodiments are defined in the dependent claims.

In one embodiment of the invention, a method is carried out by a computer or set of computers in order to generate correction information (hereinafter referred to as "regional correction information"). The regional correction information comprises information for correcting observations useful for determining, i.e. estimating, phase ambiguities and/or the position of one or more global or regional NSS receivers located in a region of interest (under a region of the ionosphere). The method comprising the following steps: For each of a plurality of reference stations in the region of interest, raw observations obtained by the reference station observing NSS multiple-frequency signals from a plurality of NSS satellites over multiple epochs are received. Information (hereinafter referred to as "precise satellite information") on the orbit position of each of the satellites, a clock offset of each of the satellites, and a set of biases associated with each of the NSS satellites, is also obtained (or, alternatively, information derived from the precise satellite information is obtained). For each of the reference stations, ambiguities in the carrier phase of the received raw observations are estimated, using (i) the precise satellite information (or, alternatively, the information derived from the precise satellite information), and (ii) the known position coordinates of the reference station. Geometric-free phase linear combination values are then computed based on the received raw observations together with the estimated ambiguities. The regional correction information is then generated based on the computed geometric-free phase linear combination values, wherein the regional correction information comprises, for each of the NSS satellites, at least one mathematical function (each hereinafter referred to as "regional ionospheric delay function") and its coefficients (hereinafter referred to as "regional ionospheric delay coefficients"). The regional ionospheric delay function(s) and its regional ionospheric delay coefficients represent, per NSS satellite, the ionospheric delay in the region of interest. The regional correction information is then sent, for example to facilitate position determination, to the NSS receiver(s) and/or to one or more servers in charge of processing raw observations obtained by the NSS receiver(s).

The method enables the provision, to NSS receivers and/or to servers in charge of processing observations from NSS receiver(s), of regionally-applicable correction information (i.e., regional correction information) for use for example by PPP applications, to reduce the convergence time of the positioning solution. The regional correction information represents regional ionosphere correction models. The method enables the estimation of such regional ionosphere correction models. There is one regional ionosphere correction model per satellite.

The invention also relates, in one embodiment, to a method carried out by an apparatus, which may be a global or regional NSS receiver or a server in charge of processing observations from NSS receiver(s). In particular, the apparatus receives regional correction information, which comprises, for each of a plurality of NSS satellites, (i) at least one mathematical function (each hereinafter referred to as "regional ionospheric delay function"), and (ii) its coefficients (hereinafter referred to as "regional ionospheric delay coefficients"). The regional ionospheric delay so function(s) and its regional ionospheric delay coefficients represent, per NSS satellite, the ionospheric delay in a region of interest (under a region of the ionosphere). The apparatus also observes NSS multiple-frequency signals from the plurality of satellites over multiple epochs (in this case, the apparatus is a NSS receiver), or the apparatus receives such observed signals from the NSS receiver. Ambiguities in the carrier phase of the observed signals are then estimated using the received regional correction information, and/or the position of the NSS receiver is estimated using the observed signals and the received regional correction information.

The invention also relates, in one embodiment, to an apparatus for generating regional correction information, in the manner described above. The invention also relates, in one embodiment, to the regional correction information itself.

The invention also relates, in one embodiment, to an apparatus configured for receiving and making use of the regional correction information, in the manner described above.

The invention also relates, in some embodiments, to computer programs, computer program products, and storage mediums for storing such computer programs, comprising computer-executable instructions for carrying out, when executed on a computer such as one embedded in a NSS receiver or in another apparatus, any one of the above-mentioned methods.

BRIEF DESCRIPTION OF THE DRAWINGS

Embodiments of the present invention shall now be described, in conjunction with the appended drawings in which.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Throughout the following detailed description, the abbreviation "GNSS" is used. The invention is, however, not limited to global navigation satellite systems (GNSS) but also applies to regional navigation satellite systems (RNSS). Thus, it is to be understood that each occurrence of "GNSS" in the following can be replaced by "RNSS" to form additional embodiments of the invention.

When the term "real-time" is used in the present document, it means that there is an action (e.g., data is processed, results are computed) as soon as the required information for that action is available. Thus, certain latency exists, which depends on various aspects depending on the involved component(s) of the system.

Figure 3:
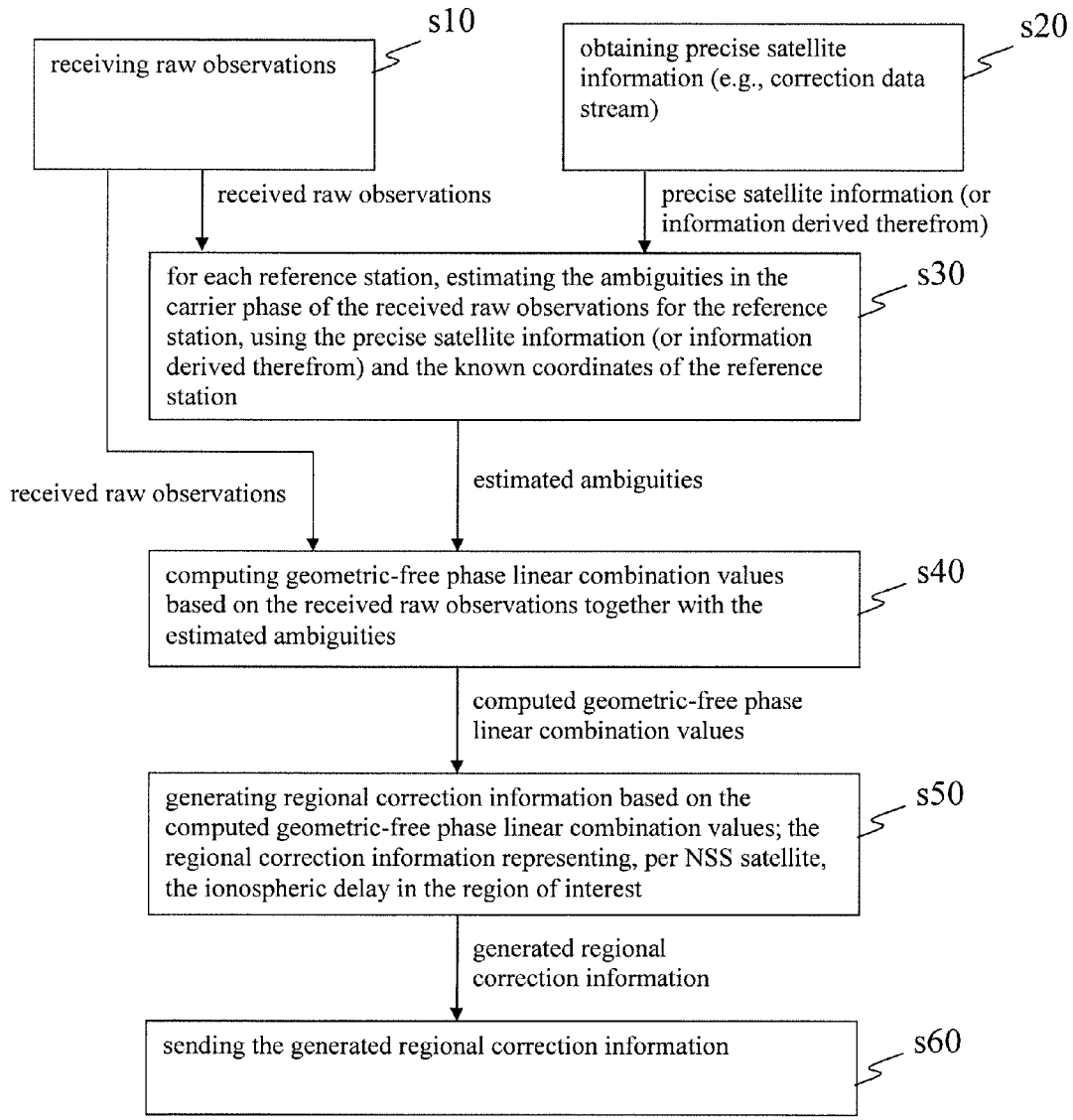
FIG. 3 is a flowchart of a method in one embodiment of the invention.

FIG. 3 is a flowchart of a method according to one embodiment of the invention. The method is carried out by a computer or set of computers for generating regional correction information to be used to correct observations of at least one global or regional NSS receiver for example for a positioning process. The NSS receiver(s) may be static or moving and may be located, at one point in time, in a region of interest (under a region of the ionosphere). The region of the ionosphere may for example be a spherical cap, but may also have a polygonal or elliptical shape, for example. The size of the region of the ionosphere comprises, in one embodiment, less than half of the ionosphere. In a more specific embodiment, the size of the ionosphere region under consideration comprises less than one fifth of the ionosphere. In yet a more specific embodiment, the size of the ionosphere region under consideration comprises less than one tenth of the ionosphere.

The regional correction information comprises information for correcting observations useful for estimating phase ambiguities and/or a position of the NSS receiver(s). The method may eventually lead to estimating the rover position, i.e. the position of the NSS receiver. The method may be performed by a network node or a plurality of network nodes.

In particular, the method comprises the following steps.

In step s10, for each of a plurality of reference stations in the region of interest, raw observations are received. The raw observations for each reference station are obtained by the reference station observing NSS multiple-frequency signals from a plurality of NSS satellites over multiple epochs. The plurality of NSS satellites may belong to the same navigation satellite system (e.g., GPS), or to more than one navigation satellite system (e.g., GPS and GLONASS). The plurality of reference stations together form a regional reference station network (also called "regional GNSS tracking network").

In step s20, precise satellite information is obtained, i.e. information on at least (i) the orbit position of each of the plurality of NSS satellites, (ii) a clock offset of each of the plurality of NSS satellites, and (iii) a set of biases associated with each of the plurality of NSS satellites. Alternatively, information derived from the precise satellite information may be obtained. For example, the information on the orbit position of the satellites can be represented by Keplerian elements and additional parameters. The precise satellite information typically originates from observations made by a global network of reference stations. Optionally, a global ionosphere model is also obtained, which is applicable both within and outside the region of interest.

In step s30, for each of the plurality of reference stations (i.e., for each of the reference stations of the regional reference station network), ambiguities in the carrier phase of the received raw observations are estimated for the reference station. This step makes use of (i) the precise satellite information or, alternatively, the information derived from the precise satellite information, and (ii) the known position coordinates of the reference station. The above-mentioned global ionosphere model, if obtained, may also be used for the ambiguity estimation, i.e. for step s30, as the global ionosphere model also provides useful information.

In other words, using the raw observations and the precise satellite information (or information derived therefrom), and optionally a global ionosphere model, the ambiguities are estimated for each satellite-receiver-link within the regional reference station network. In one embodiment, the ambiguities are set to integer values and thus regarded as fixed (fixed solution). In particular, when the estimated ambiguities are sufficiently close to integer values (e.g., using a threshold), they are set to integer values. The threshold can be any small value, such as for example one tenth of a cycle. In another embodiment, the ambiguities are estimated and set to real number values (float solution). In another embodiment, not all but the majority of ambiguities are fixed. For the remaining ambiguities, float values are available. This embodiment or solution is understood as being "ambiguity resolved" in the following. In a broader sense, the ambiguity resolved solution may also include the ambiguity fixed solution as a particular case of the ambiguity resolved solution. Typically, the embodiments with the ambiguity resolved solution are preferred to the embodiments with the float solution, since the ambiguity resolved solution exploits the integer nature of the phase ambiguities and is therefore better, i.e. more accurate, than the float solution.

Step s30 may for example be carried in a parallel computing mode for each reference station. There is no need to run the ambiguity estimation in a serial computing mode. Thus, the processing load grows only slowly with the number of reference stations, in the sense that the overall CPU time grows approximately linearly with the number of reference stations.

In step s40, geometric-free phase linear combination values are computed based on the received raw observations together with the estimated ambiguities. This enables the cancellation of the effects of the satellites' motion relative to the reference stations, the effects of the troposphere, the effects of the receiver clock of each reference station, and the effects of satellite clocks. At this stage, the remaining effects comprise the effects of the ionosphere, the effects of the reference stations' receiver ionospheric-phase biases, and the effects of the satellite ionospheric-phase biases, as apparent from exemplary equation (7) below.

In step s50, the regional correction information is generated based on the computed geometric-free phase linear combination values. The regional correction information comprises, for each of the plurality of NSS satellites, (i) at least one mathematical function, each of which being hereinafter referred to as "regional ionospheric delay function", and (ii) its coefficients, hereinafter referred to as "regional ionospheric delay coefficients". The regional ionospheric delay function(s) and its regional ionospheric delay coefficients represent, per NSS satellite, the ionospheric delay in the region of interest.

The regional ionospheric delay function(s) and its coefficients may for example represent the slant ionospheric delay in the region of interest. Alternatively, the regional ionospheric delay function(s) and its coefficients may represent the vertical ionospheric delay in the region of interest.

The regional ionospheric delay function(s) may for example be a spherical harmonics expansion. In one embodiment, the regional ionospheric delay function(s) and its coefficients are obtained by an Adjusted Spherical Cap Harmonics Analysis technique, this technique being as such known in the art.

An exemplary embodiment of step s50 will be described in more detail below with reference to FIG. 4.

In step s60, the regional correction information is sent to the NSS receiver(s) and/or to apparatus(es) in charge of processing observations from NSS receiver(s), for example for use in PPP applications. The regional correction information may be transmitted in any kind of format, such as for example using Internet Protocol (IP) packets transmitted through a terrestrial radio link, a satellite link, or any other suitable communication link(s) (the same applies to the global correction information and the accuracy indicating information, discussed elsewhere in the present document). The accuracy of the regional correction information is typically in the centimeter range (i.e., accurate in the range of a few centimeters), and the accuracy may also be, optionally, explicitly described by corresponding accuracy indicating information, such as accuracy indicators.

In one exemplary embodiment, the regional correction information is sent, in step s60, as follows: Every second, one per-satellite regional ionosphere correction model (including accuracy information) is sent out. Assuming that there are, for example, 20 per-satellite regional ionosphere models available in one epoch, the complete regional correction information is sent out in 20 seconds.

The regional correction information is absolute and consistent with the biases of the correction stream described in references [3] and [4]. This is especially true for the satellite bias of the geometric-free linear combination of the phase observations, also called satellite ionospheric-phase bias. See in that respect exemplary equation (7). The regional correction information, if not initially consistent with the biases of the correction stream described in references [3] and [4], can be made consistent therewith by using additional information to calculate the differences between the biases of the correction stream and the regional correction information.

Figure 4:
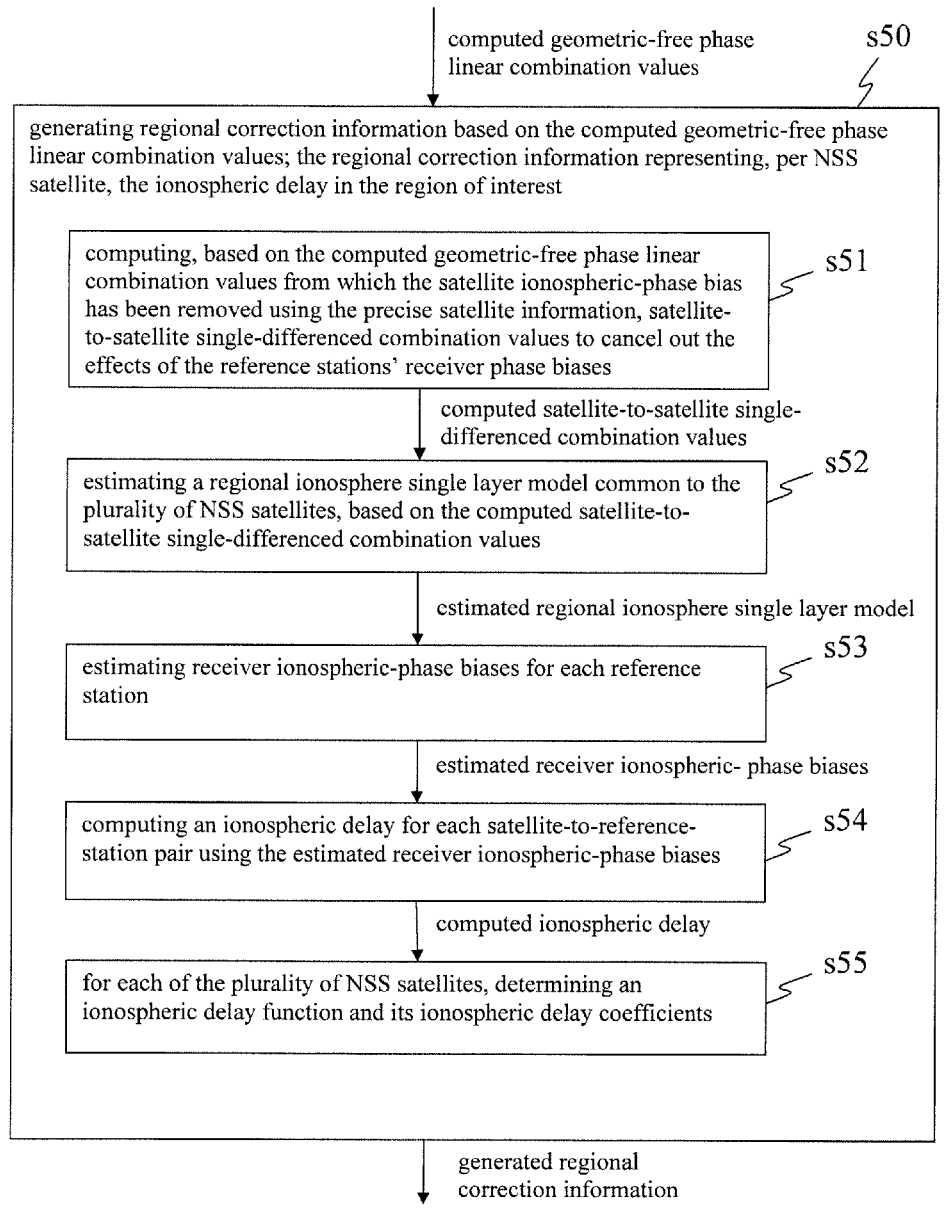
FIG. 4 is a flowchart of a step of generating regional correction information in a method in one embodiment of the invention.

FIG. 4 is a flowchart of an exemplary step s50 of generating regional correction information in a method according to one embodiment of the invention. Generating the regional correction information comprises the following (sub-)steps.

In (sub-)step s51, satellite-to-satellite, single-differenced combination values are computed based on the computed geometric-free phase linear combination values (which are additionally ambiguity resolved), to cancel out the effects of the reference stations' receiver phase biases. The satellite ionospheric-phase bias is removed by taking the values from the precise satellite information. This removal and the generation of single-differenced combination values are advantageous in that those combination values only depend on the ionospheric delay, i.e. they are independent from the receiver and satellite ionospheric-phase biases—see in that respect exemplary equation (9) below.

In (sub-)step s52, a regional ionosphere single layer model common to the plurality of NSS satellites is estimated based on the computed satellite-to-satellite, single-differenced combination values. The regional ionosphere single layer model (also referred to as "common regional ionosphere single layer model" or CRSLM) represents the vertical ionospheric delay in the region of interest. In this model estimation step, the number of unknowns does not change when the number of reference stations is increased, since the only unknowns in step s52 are those associated with the ionosphere.

In (sub-)step s53, receiver ionospheric-phase biases for each reference station are estimated based on a residual quantity which is obtained by subtracting the estimated CRSLM from the geometric-free phase linear combination values which are additionally ambiguity resolved and further reduced by the satellite ionospheric-phase bias from the precise satellite information. See in that respect equations (8), (11) and (12) and their corresponding explanations. If the plurality of NSS satellites belong to more than one navigation satellite system, step s53 of estimating the receiver ionospheric-phase biases comprises estimating the receiver ionospheric-phase biases for each reference station and navigation satellite system. The receiver ionospheric-phase bias for different navigation satellite systems is independent from each other.

In (sub-)step s54, an ionospheric delay for each satellite-to-reference-station pair is computed using the estimated receiver ionospheric-phase biases. See in that respect exemplary equations (13a) and (13b) below.

In (sub-)step s55, for each of the plurality of NSS satellites, a regional ionospheric delay function and its regional ionospheric delay coefficients are determined (i.e., estimated) based on the computed ionospheric delay. The regional ionospheric delay function and its regional ionospheric delay coefficients represent the ionospheric delay for the satellite. This step leads to generating the regional correction information comprising the regional ionospheric delay function(s) and its regional ionospheric delay coefficients representing the ionospheric delay in the region of interest per satellite (i.e., each satellite is considered individually). The represented ionospheric delay may be the slant ionosphere delay, or may be the vertical ionosphere delay obtained from the slant absolute ionosphere delay after applying an ionospheric mapping function. See in that respect equation (14).

The estimation of the regional ionospheric delay function(s) and its coefficients is carried out per satellite, as described above, and may additionally be improved by direct observations for the vertical ionosphere delay obtained from the common regional ionosphere single layer model to cover areas inside the region of interest without observations from reference stations (either there are no reference stations in some areas of the region of interest or they simply do not provide observations due to a failure, or because the ambiguity resolution was not yet successful). See in that respect also equation (10). The ionospheric pierce points of all receiver-satellite-links contributed to the common regional ionosphere single layer model (CRSLM); see the detailed description of the "Ionosphere Single Layer Model" below and FIG. 2 for the explanation of the term "ionospheric pierce point". Therefore, in those regions where the regional ionospheric delay function, estimated per satellite, is unobserved, the CRSLM is, in contrast, very likely based on observations because, in those regions, there are very likely pierce points belonging to other satellites being observed with a different elevation angle. Hence, the additional, direct observations for the vertical ionosphere delay, obtained from the CRSLM, are advantageous for the estimation of the per satellite, regional ionospheric delay function.

Figure 5:
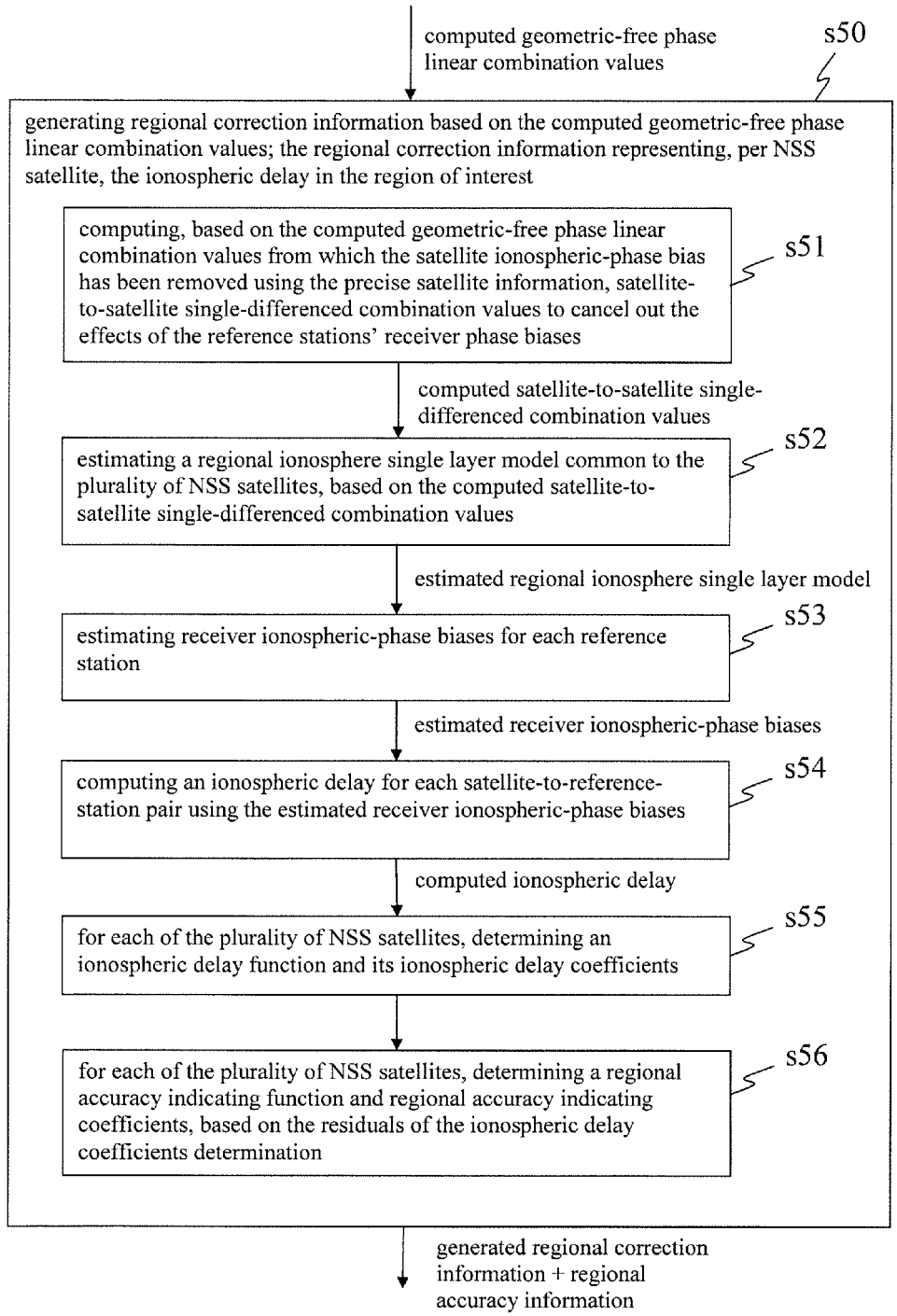
FIG. 5 is a flowchart of a step of generating regional correction information in a method in one embodiment of the invention.

FIG. 5 is a flowchart of a step s50 of generating regional correction information in a method in one embodiment of the invention. In addition to (sub-)steps s51 to s55 described with reference to FIG. 4, generating the regional correction information comprises the following, further (sub-)step s56.

In (sub-)step s56, for each of the plurality of NSS satellites, a mathematical function, hereinafter referred to as "regional accuracy indicating function", and its coefficients, hereinafter referred to as "regional accuracy indicating coefficients", are determined (i.e. estimated) based on the residuals of the regional ionospheric delay coefficients determination (i.e. step s55). The regional accuracy indicating function and its regional accuracy indicating coefficients represent, per satellite, the vertical accuracy of the ionospheric delay.

The output of step s50 therefore comprises the regional correction information, as well as the regional accuracy indicating function(s) and its coefficients, together representing the ionosphere delay and its accuracy (output of steps s55 and s56).

Figure 6:
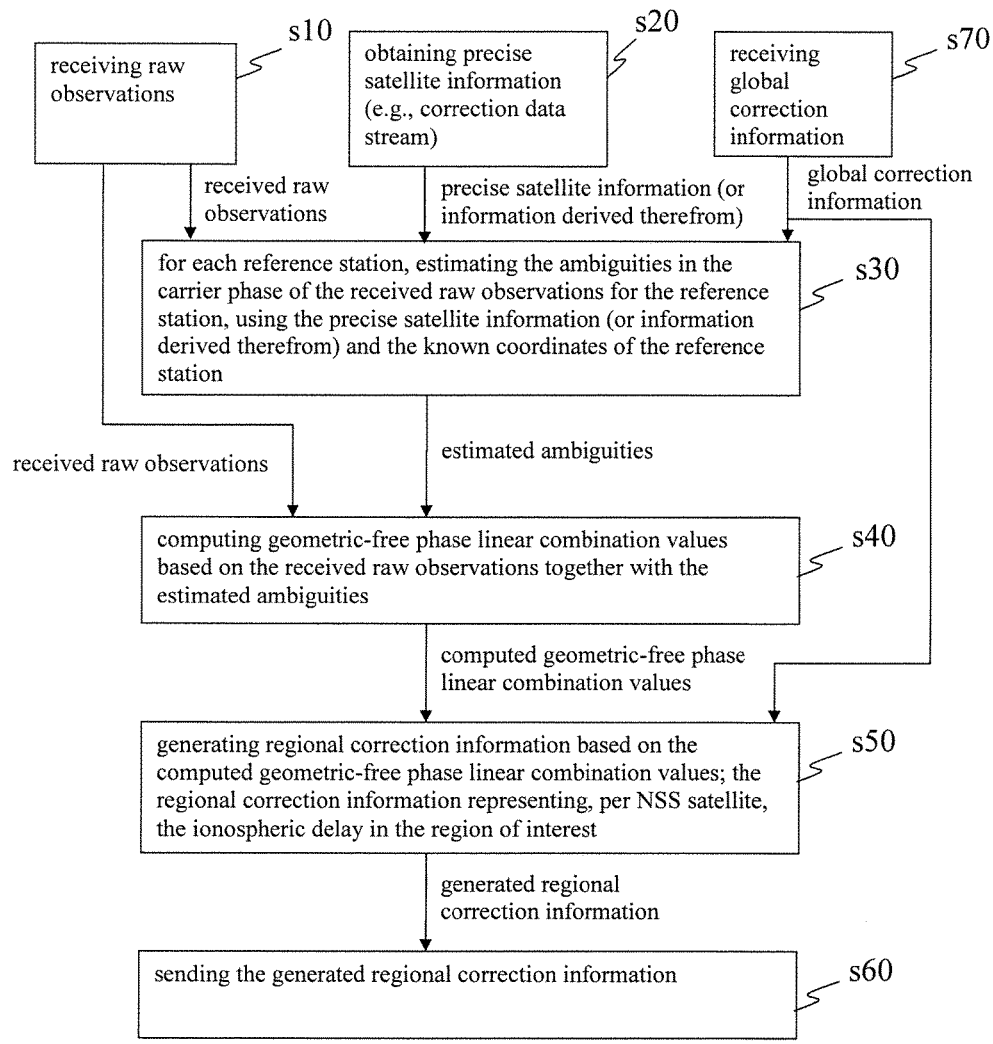
FIG. 6 is a flowchart of a method in one embodiment of the invention.

FIG. 6 is a flowchart of a method in one embodiment of the invention, which, in addition to generating the regional correction information as described with reference to FIG. 3, comprises the following additional step s70.

In step s70, additional correction information ("global correction information") is used in at least one of steps s30 to s50 as described above. The global correction information may also be sent to the NSS receiver(s) (not illustrated) and/or sent to apparatus(es) in charge of processing observations from NSS receiver(s) (not illustrated). The global correction information comprises at least one mathematical function and its coefficients. The mathematical function(s) and its coefficients represent the ionospheric delay under the entire ionosphere. Global accuracy indicating information (such as for example accuracy indicators) may also be used in steps s30 to s50 and/or transmitted to indicate a measure of how accurate the global correction information is.

In one embodiment, step s52 of estimating the regional ionosphere single layer model comprises: improving the regional ionosphere single layer model using the global correction information associated with points provided in a grid (such as for example a regular grid) within the region of interest to provide an absolute level of the ionospheric delay to the regional ionosphere single layer model. In other words, the estimation of the common regional ionosphere single layer model (CRSLM) is improved based on the global correction information (representing the global ionosphere model), especially to provide the absolute level of the ionospheric delay of the CRSLM. To do so, the region of interest is covered by a grid of points. For every grid point, the absolute ionosphere delay from the global ionosphere model is used to support the CRSLM estimation and to provide the absolute level of the ionospheric delay.

Figure 7:
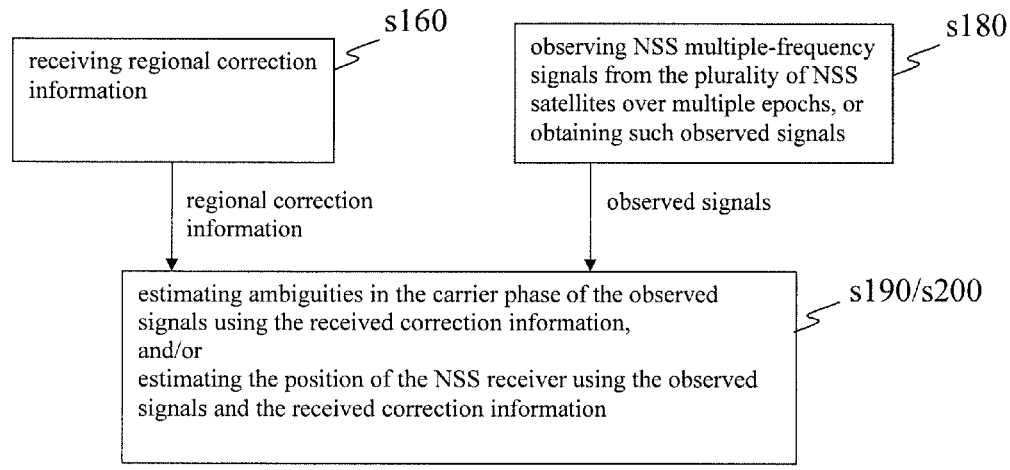
FIG. 7 is a flowchart of a method carried out by an apparatus making use of regional correction information, in one embodiment of the invention.

FIG. 7 is a flowchart of a method according to one embodiment of the invention. The method is carried out by an apparatus, which may be a NSS receiver or a server in charge of processing observations from NSS receiver(s), and comprises the following steps.

In step s160, regional correction information is received. The regional correction information comprises, for each of a plurality of NSS satellites, (i) at least one mathematical function, each of which being hereinafter referred to as "regional ionospheric delay function", and (ii) its coefficients, hereinafter referred to as "regional ionospheric delay coefficients". The regional ionospheric delay function(s) and its regional ionospheric delay coefficients represent, per NSS satellite, the ionospheric delay in a region of interest (under a region of the ionosphere).

In step s180, NSS multiple-frequency signals from the plurality of NSS satellites are observed over multiple epochs (in this case, the apparatus performing the method is a NSS receiver), or the apparatus receives such observations from a NSS receiver.

Then, steps s190 and/or s200 are performed: In step s190, ambiguities in the carrier phase of the observed signals are estimated using the received regional correction information. In step s200, the position of the NSS receiver is estimated using the observed signals and the received regional correction information.

Figure 8:
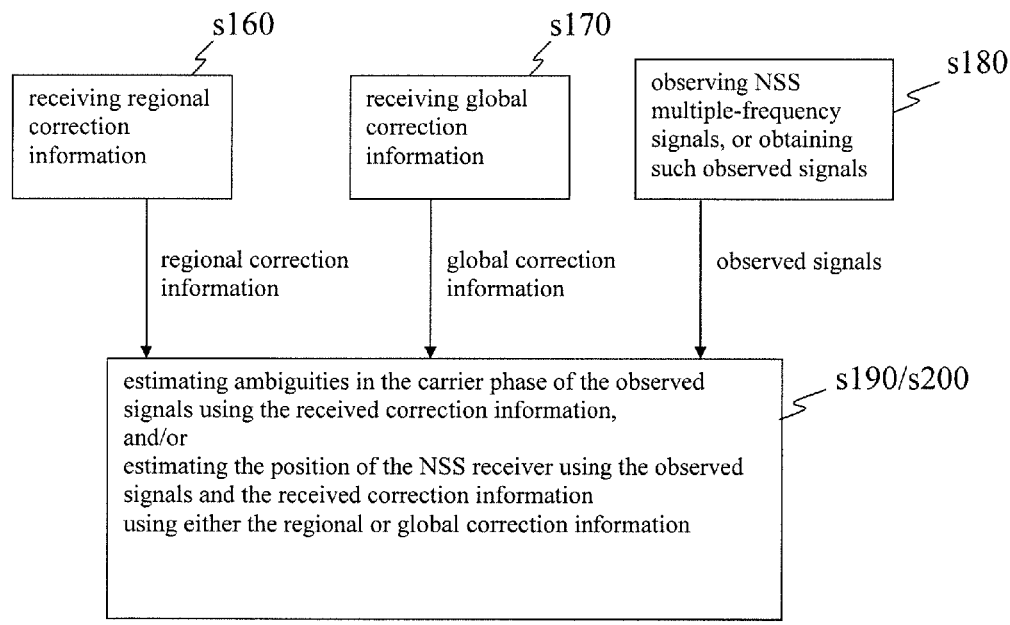
FIG. 8 is a flowchart of a method carried out by an apparatus making use of regional correction information, in one embodiment of the invention.

FIG. 8 is a flowchart of a method according to one embodiment of the invention, which comprises, in addition to the steps described with reference to FIG. 7, the following step s170.

In step s170, additional correction information ("global correction information") is received. The global correction information comprises (i) at least one mathematical function, each of which being hereinafter referred to as "global ionospheric delay function", and (ii) its coefficients, hereinafter referred to as "global ionospheric delay coefficients". The global ionospheric delay function(s) and its global ionospheric delay coefficients represent the ionospheric delay under the entire ionosphere.

In this embodiment, step s190 of estimating ambiguities in the carrier phase of the observed signals, and/or step s200 of estimating the position of the NSS receiver using the observed signals, make use, per NSS satellite, of either the regional correction information or the global correction information. The regional and global correction information is not used together for one and the same satellite, but the decision regarding which correction information to use is made independently for each satellite. Thus, at one point in time, the regional correction information may be used for one or more satellites while the global correction information is used for the other satellites.

Therefore, the regional correction information (representing regional ionosphere correction models) can be regarded as a regional augmentation to the global correction information. Furthermore, since the regional correction information is absolute and consistent with the biases of the correction stream described in references [3] and [4], a smooth transition between the global and the regional ionosphere model (represented respectively by the global and regional correction information) is possible. If regional correction information is available for a given satellite, said regional correction information is typically used. Otherwise, the global correction information is used. The regional correction information, if not initially consistent with the biases of the correction stream described in references [3] and [4], can be made consistent therewith by using additional information to calculate the differences between the biases of the correction stream and the regional correction information.

Switching from the regional to the global correction information is possible, and vice versa. For example, such a switching may occur as the receiver is moving.

In one embodiment, the regional correction information further comprises, for each of the plurality of NSS satellites, a mathematical function (hereinafter referred to as "regional accuracy indicating function") and its coefficients (hereinafter referred to as "regional accuracy indicating coefficients"). The regional accuracy indicating function and its regional accuracy indicating coefficients represent the vertical accuracy of the ionospheric delay represented by the regional ionospheric delay function(s) and its coefficients.

Furthermore, in this embodiment, the global correction information further comprises at least one mathematical function (hereinafter referred to as "global accuracy indicating function") and its coefficients (hereinafter referred to as "global accuracy indicating coefficients"). The global accuracy indicating function and its global accuracy indicating coefficients represent the vertical accuracy of the ionospheric delay represented by the global ionospheric delay function(s) and its coefficients.

In this embodiment, step s190 of estimating ambiguities in the carrier phase of the observed signals and/or step s200 of estimating the position of the NSS receiver using the observed signals comprises determining which one of the regional correction information and the global correction information is more accurate by at least comparing the regional accuracy indicating function, taking into account its regional accuracy indicating coefficients, to the global accuracy indicating function, taking into account its global accuracy indicating coefficients, and making use of the more accurate of the regional correction information and the global correction information.

Let us now further explain the context in which some embodiments of the invention have been developed, for a better understanding thereof.

PPP with Ionosphere Models

In the above "Background" section (see especially references [3] and [4]), it has been explained that the availability of an ionosphere model should reduce the convergence time of the rover positioning solution in PPP applications. The reduction of the convergence time depends on the quality of the ionosphere model. Thus, it is advantageous not only to provide the ionosphere model itself, but also a measure of its accuracy as input to the GNSS data processing. In that context, EP 2 746 811 A2 (hereinafter referred to as reference [5]) describes how such an accuracy indicator may for example be provided for an ionosphere model. Furthermore, Drescher R., Chen X., Landau H., Kipka A., Glocker M., Gomez V. (2013), "Accelerating the Convergence of Trimble CenterPoint RTX Positioning by using a Global Ionospheric Model", GNSS PPP Workshop: Reaching Full Potential, Ottawa, Canada (hereinafter referred to as reference [6]) shows that the convergence time was significantly reduced by the usage of a global ionosphere model and its accuracy indicator.

Network RTK

Within a network, the common-mode errors of GNSS positioning are orbit errors and propagation-time errors caused by the atmosphere. Common-mode errors are nearly identical for GNSS stations being close to each other. The larger the distance between two GNSS stations, the less the errors are common.

In network RTK, a network of reference stations is not used to merely select the closest reference station for the relative positioning of a rover station (although that would indeed reduce the common-mode errors). The main aim of network RTK is the estimation of common-mode errors at the reference stations based on fixed double difference ambiguities. Then, the errors are interpolated for the location of the rover station. Since the error reduction by interpolation is better than the reduction by observation differencing, the spacing between reference stations can be increased to 50 to 100 km.

Popular Network RTK methods include the so-called Area Correction Parameters, the Virtual Reference Station (VRS) (Landau, H., Vollath, U., Chen X., "Virtual Reference Station Systems", Journal of Global Positioning Systems (2002) Vol. 1, No. 2: 137-143), and the Master Auxiliary Concept (MAC) (Brown et al. (2006): RTK Rover Performance using the Master-Auxiliary Concept, Journal of Global Positioning Systems, Vol. 5, No. 1-2: 135-144). In all these methods, the observation data of one or several reference stations is conditioned (for example by generating so-called virtual data) and eventually transmitted to the rover station. The approximate rover position is typically transmitted to the Network RTK service provider to select or compile the observation data being useful for the rover location, and to transmit only that data from the service provider to the user.

GNSS Signal Processing with Regional Augmentation

The VRS method requires the rover station to send its approximate position to a server so that the server can generate the geometric and ionospheric corrections for the rover location. The MAC technique is designed as a broadcast method which transmits all reference station data to the rover station, and the rover station computes the correction for its location. However, due to bandwidth constraints, transmitting data from a large number of reference stations is impractical using wireless technology.

International applications WO 2011/126605 (hereinafter referred to as reference [7]), WO 2011/100680 (hereinafter referred to as reference [8]), and WO 2011/100690 (hereinafter referred to as reference [9]) describe methods to derive a set of corrections based on fixed double difference ambiguities between reference stations in the regional network. The corrections enable the reconstruction of code and phase observations of the reference stations. The ability to reconstruct the geometric part (ionospheric-free observation combination, i.e. ionospheric-effects free observation combination) is based on the phase-leveled geometric term per satellite. This geometric correction term encapsulates the integer nature of the ambiguity and compensates the orbit error and satellite clock error seen in the regional reference station network. The non-ionospheric part of the regional network correction comprises the code biases, phase-leveled geometric correction and the optional tropospheric values.

The ionospheric part of the regional reference station network correction is derived from the ionospheric carrier phase dual frequency combination minus the ambiguity determined from the processing of the regional network observations. For m reference stations and n satellites, m.n ionospheric corrections are transmitted for processing the rover observations. The advantage of this approach compared to Network RTK is that no master station is required. The bandwidth required is much less than the one required by the MAC technique. For example, for 80 reference stations tracking 12 satellites, a transmission bandwidth of about 220 to 2500 bits per second should provide an update rate of 10 seconds.

References [8] and [9] also describe how to generate Synthetic Reference Station (SRS) data for processing of rover observations and the messages to transmit the correction. This method has been used in the United States since 2011 (see Chen X., Allison T., Cao W., Ferguson K., Gruenig S., Gomez V., Kipka A., Koehler K., Landau H., Leandro R., Lu G., Stolz R., Talbot N. "Trimble RTX, an Innovative New Approach for Network RTK", ION GNSS 2011).

Let us now describe in more details some technical considerations useful for understanding some embodiments of the invention.

The Propagation of Microwaves within the Ionosphere

The ionosphere is an atmospheric layer which extends from an altitude of approximately 60 km to an altitude of approximately 1000 km. Within the ionosphere, the propagation velocity of microwaves depends on the extent of ionization, which in turn mainly depends on the solar radiation. As mentioned above, the effect on the signal propagation time is dispersive, i.e. it depends on the frequency of the signal. Therefore, the effect is also different for the code and phase observations. The code observations are delayed whereas the phase observations are advanced. The extent of ionization can be expressed by the Total Electron Content (TEC) which is typically expressed in TEC units (TECU). The propagation-time errors of the code and phase observations in units of length caused by the Slant Total Electron Content along the signal path in a first-order approximation can be written as:

$$I_{f,Code} = \frac{40.28}{f^2} \cdot STEC \quad (1)$$

$$I_{f,Phase} = -\frac{40.28}{f^2} \cdot STEC \quad (2)$$

where
$I_{f,Code}$ is the delay of the code observations in meters,
$I_{f,Phase}$ is the advance of the phase observations in meters,
f is the frequency of the signal in $10^8$ Hz, and
STEC is the Slant Total Electron Content along the signal path in TECU.

The contribution of the higher orders, i.e. the residual error of the first-order approximation, typically does not exceed a few centimeters.

Ionosphere Models

An ionosphere model provides the STEC along the signal path. By using equations (1) and (2), the code and phase observations can be corrected to account for the propagation-time errors caused by the ionosphere. These models either integrate the electron content along the signal path or use some simplifications. A common simplification is the Ionosphere Single Layer Model.

Ionosphere Single Layer Model

Figure 1:
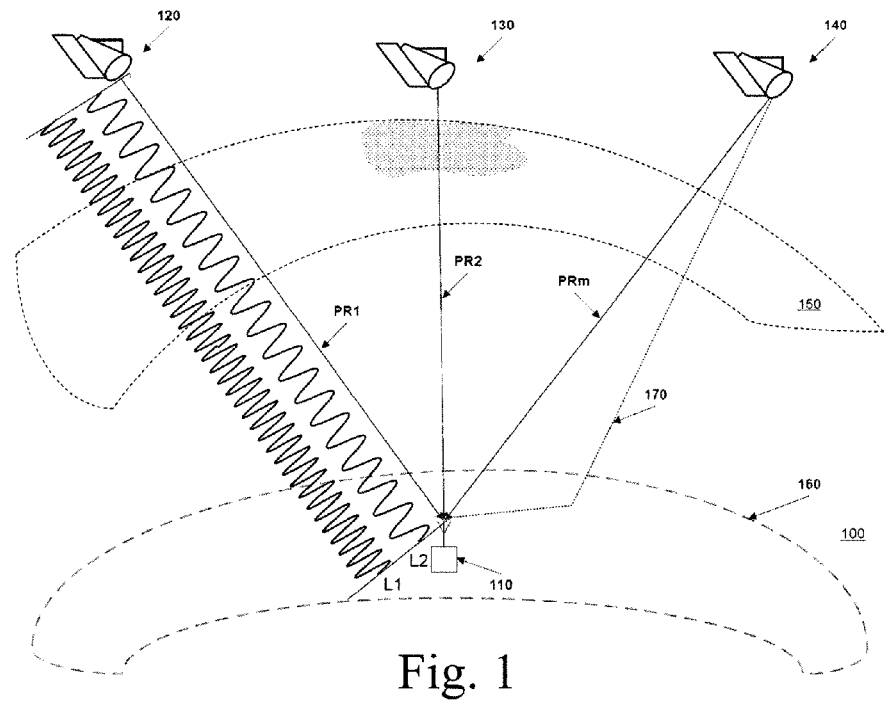
FIG. 1 schematically illustrates a typical prior-art scenario to determine a rover position.
Figure 2:
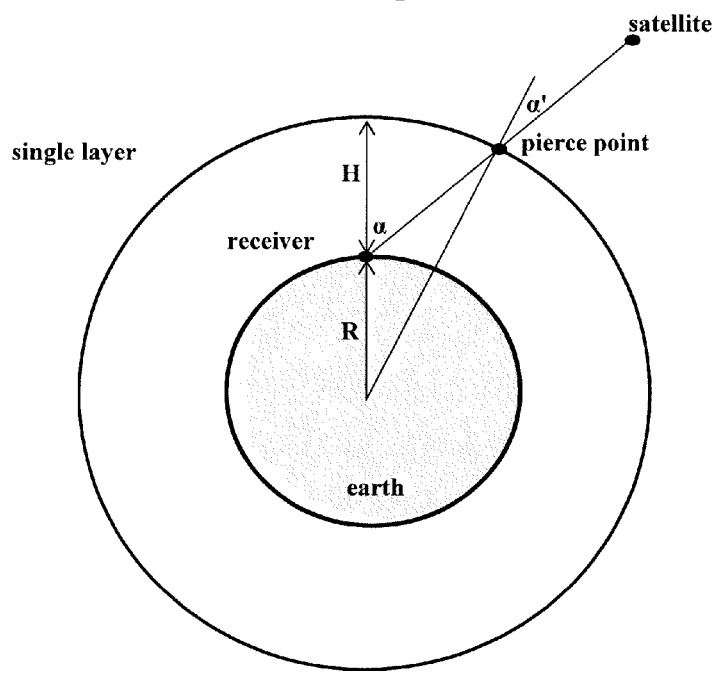
FIG. 2 schematically illustrates an ionosphere single layer model.

FIG. 2 schematically illustrates an Ionosphere Single Layer Model (SLM). It concentrates the TEC of the ionospheric layer in an infinitesimal thin sphere layer at the layer height H. The signal path intersects that layer in the ionospheric pierce point and the vertical TEC for that pierce point is provided directly by the SLM. It is afterwards mapped to the STEC by means of an ionospheric mapping function which may for example be written as:

$$STEC = mf_{Iono} \cdot VTEC = \frac{1}{\cos(\alpha')} \cdot VTEC \quad (3)$$

where $mf_{Iono}$ is the ionospheric mapping function $\alpha'$ is the intersection angle at the pierce point as shown in FIG. 2, and VTEC is the vertical TEC at the pierce point.

The mapping function given implicitly by equation (3) is derived from the geometry given by FIG. 2. This is merely an exemplary ionospheric mapping function. Other mapping functions may be used (see for example Schaer S. (1999): Mapping and Predicting the Earth's Ionosphere Using the Global Positioning System. Dissertation, Geodätisch-geophysikalische Arbeiten in der Schweiz, Vol. 59).

Global Ionosphere SLM Derived from GNSS Observations

A Global Ionosphere SLM expresses the global ionosphere by the VTEC values on a sphere layer. Thus, the ionospheric signal delay should be expressed as a function of the pierce point position and a number of unknowns describing the VTEC values on a sphere. More generally, a function is needed which can provide values dependent on the latitude and longitude. As one example, spherical harmonics expansions solve this problem and are often used in earth sciences to represent global fields (e.g. the global gravitation field and global magnetic field are often expressed using spherical harmonics expansions).

Spherical Harmonics (SH)

The spherical harmonics expansion can be written as:

$$F_{(\Phi,\Lambda)} = \sum_{n=0}^{N_{max}} \sum_{m=0}^{n} [(C_{n,m} \cdot \cos(m\Lambda) + S_{n,m}(m\Lambda)) \cdot P_{n,m(\Phi)}] \quad (4)$$

where $F_{(\Phi,\Lambda)}$ is the value of the spherical harmonics expansion for a dedicated point $\Phi$ and $\Lambda$ are the latitude and longitude of the dedicated point on the sphere, n and m are the degree (n) and order (m) of the spherical harmonics expansion, $N_{max}$ is the maximum degree of the spherical harmonics expansion, $C_{n,m}$ and $S_{n,m}$ are the coefficients of the spherical harmonics expansion, and $P_{n,m(\Phi)}$ are the Associated Legendre Polynomials.

The Associated Legendre Polynomials are known functions, whereas the coefficients of the spherical harmonics expansion are initially unknown and have to be determined by a corresponding GNSS parameter estimation approach. The number of coefficients or summands, and thus the resolution of the expansion, is controlled by the selected maximum degree.

Regional Ionosphere SLM Derived from GNSS Observations

A regional ionosphere SLM expresses the ionosphere by the VTEC values on a section of a sphere layer. Thus, the ionospheric signal delay should be expressed as a function of the pierce point position and a number of unknowns describing the VTEC values on a section of a sphere. More generally, a function is needed which can provide values dependent on the latitude and longitude within the section. As one example, the Adjusted Spherical Cap Harmonics Analysis technique solves this problem for a section being a spherical cap. The invention is however not limited to a circular spherical cap. Other sections may be used, having for example a polygonal or elliptical shape. Slepian functions can be used for any shape on a sphere.

Adjusted Spherical Cap Harmonics Analysis (ASHA) Technique

In general, ASHA means using spherical harmonics in a spherical cap, as explained for example in De Santis A., Chiappini M., Dominici G. & Meloni A., "Regional Geomagnetic Field Modelling: the contribution of the Istituto Nazionale di Geofisica", Annali di Geofisica, Vol. XL, 5, 1161-1169, 1997. Therefore, it is necessary to transform the spherical coordinates given by the latitude and longitude (originally given on the complete sphere) into another coordinate system which is suitable or valid respectively only inside the cap. First of all, the azimuth and spherical distance of an arbitrary point inside the cap with respect to the cap center are computed. Afterwards, the cap center can be considered as the pole of a sphere, the azimuth as longitude and the spherical distance as co-latitude, because on a sphere a spherical distance is always also an angle at center. Therefore, the maximum value for the co-latitude is the radius of the cap. In a next step, the cap is mathematically enlarged to a hemisphere. This is done by scaling the co-latitude by the ratio between the cap radius and 90 degrees. Finally, the azimuth and the scaled co-latitude describe a spherical coordinate system on a hemisphere (azimuth=$\lambda_{ASHA}$, scaled co-latitude=$90°-\varphi_{ASHA}$). Therefore, spherical harmonics as given by equation (4) can be used to describe a scalar function on the spherical cap whereas $\Lambda$ has to be replaced by $\lambda_{ASHA}$ and $\Phi$ has to be replaced by $\varphi_{ASHA}$.

Determine ASHA Coefficients from Observations Inside the Cap

In general, it is possible to estimate the coefficients of equation (4) from observations by a Least-Squares approach. But by doing so, the second hemisphere is always completely without observations. This configuration defect causes numerical problems (the matrix responsible for the Least-Square solution is nearly singular; the problem is called "µl-conditioned"). In the spherical harmonics theory, there is a group of coefficients which contributes to the spherical harmonics sum in an equator-symmetric way, see e.g. Torge and Mueller, *Geodesy*, de Gruyter Verlag, 2012, 4th edition. The above-described problem can be solved by using only these coefficients.

Carrier-Phase Observations

GPS L1 and L2 carrier phase observations may be expressed as:

$$L_1 = \lambda_1 \varphi_1 = \rho + T + I_1 + c \cdot (t_r - t^s) + b_1^r - b_1^s + \lambda_1 N_1 + v_1 \quad (5)$$

$$L_2 = \lambda_2 \varphi_2 = \rho + T + \frac{\lambda_2^2}{\lambda_1^2} I_1 + c \cdot (t_r - t^s) + b_2^r - b_2^s + \lambda_2 N_2 + v_2 \quad (6)$$

where
$L_1$ and $L_2$ are the L1 and L1 carrier phase observations in metric length units,
$\lambda_1$ and $\lambda_2$ are the wavelengths of the L1 and L2 carrier phase observations in metric length units,
$\varphi_1$ and $\varphi_2$ are the L1 and L2 carrier phase observations in cycles,
$\rho$ is the geometric range between antenna phase centers of satellite and receiver,
T is the tropospheric delay,
$I_1$ is the L1 ionospheric delay,
c is the speed of light in vacuum,
$t^s$ and $t_r$ are the satellite clock error and receiver clock error, respectively,
$b_1^s$ and $b_2^s$ are the satellite L1 phase bias and satellite L2 phase bias, respectively,
$b_1^r$ and $b_2^r$ are the receiver L1 phase bias and satellite L2 phase bias, respectively,
$N_1$ and $N_2$ are L1 and L2 integer ambiguities, respectively,
$v_1$ and $v_2$ are phase noise plus multipath of L1 and L2, respectively, In GNSS positioning approaches, the determination of the rover position coordinates is of primary interest, whereas the coordinates are initially unknown and therefore estimated. As already mentioned, the quickest method to converge to an accurate position is the determination of the L1 and L2 integer ambiguities. The ambiguity determination is improved and succeeds earlier if the ionospheric delay are removed or at least reduced drastically by correction models of high quality.

The Geometric-Free Linear Combination of Carrier Phase Observations

Artificial observations can be computed from the original ones by forming linear combinations. Those linear combinations have different properties compared to the original observations. The geometric-free linear combination is given by $$L_{GF} = L_1 - L_2 = \left(1 - \frac{\lambda_2^2}{\lambda_1^2}\right) \cdot I_1 + b_{GF}^r - b_{GF}^s + \lambda_1 N_1 - \lambda_2 N_2 + v_{GF} \quad (7)$$

where
$L_{GF}$ is the artificial phase observation of the geometric-free linear combination in metric length units,
$b_{GF}^s$ is the satellite ionospheric-phase bias,
$b_{GF}^r$ is the receiver ionospheric-phase bias, and
$v_{GF}$ is phase noise plus multipath of $L_{GF}$.

Provided that precise bias data is available and the ambiguities are already resolved, the geometric-free linear combination is especially suitable to estimate the ionospheric delay I. Rather than estimating the ionospheric delay I for every receiver-satellite-link individually, an ionospheric SLM, e.g. based on spherical harmonics, may be estimated.

Let us now describe an embodiment of the invention, which is aimed at estimating the regional ionosphere correction models (i.e., the regional correction information).

By using a global ionosphere model and its accuracy indicator, the PPP convergence times are reduced significantly (see references [5] and [6]). In an embodiment of the invention, a method provides more accurate ionosphere models by using a regional densification of the reference station network in selected regions. The regional ionosphere models can be seamlessly integrated with the global ionosphere model and reduces the convergence time of the position solution when the user receiver is located in or moves into the given region (also called "region of interest"). Within the region, specified by a spherical cap, the method derives satellite individual ionosphere models from processing the observation data of a regional reference station network. The models consist of the absolute ionospheric delay and its accuracy indicators. The accuracy indicator typically corresponds to a 1-sigma standard deviation and is typically in the range of a few centimeters. In the following section, the processing steps of the method in this embodiment are described in detail.

1. Ambiguity Resolution for the Regional Reference Station Network Based on Orbit, Clock, Bias, and Global Ionosphere Information Reference [3], part 11, describes a method to generate Synthetic Reference Station (SRS) data with precise satellite information (see in that respect step s20 in FIG. 3) comprising precise orbit, code as well as phase satellite clock error, and Melbourne-Wuebbena bias. Reference [4] further includes satellite ionospheric-phase bias or ionospheric differential code bias (DCB) together with an ionosphere model to generate full SRS data. Reference [5] additionally includes accuracy information for the ionosphere model. The improvement when it comes to the user receiver position convergence is presented in reference [6].

If SRS data is generated for each reference station in the network with the method described in references [3], [4] and [5], and if the data is processed together with the reference station data, the double difference ambiguities can be resolved with the method described for example in Teunissen P. (1995), The least-squares ambiguity decorrelation adjustment: A method for fast GPS integer ambiguity estimation, Journal of Geodesy, 70(1-2), 65-82, or in WO 2010/021660 A2. The resolved ambiguities of each reference station are at the same level, as explained below. This constitutes a possible implementation of above-mentioned step s30.

If the resolved ambiguity is subtracted from the carrier phase observation of each reference station, so-called "ambiguity-reduced" observations can be generated. Characteristics of those ambiguity-reduced observations include:
1) the double difference ambiguities between the ambiguity-reduced observation and the SRS data is zero; and
2) the double difference ambiguities between the ambiguity-reduced observations of each reference station are zero.

The advantage of this approach is that network ionosphere corrections generated from the ambiguity-reduced observations are compatible with the orbit, clock, bias, and ionosphere information provided by a suitable correction stream as for example described in references [3], [4] and [5]. Therefore, the global ionosphere model can be replaced by a regional ionosphere model generated from the network ionosphere corrections or from the ambiguity-reduced observations respectively. Another advantage is that the processing of each reference station is independent, which is well suited for parallel computing with modern multi-core computers.

2. Common Regional Single Layer Ionosphere Model (See Steps s40, s51 and s52 Discussed with Reference to FIGS. 3 and 4)

In a second step, the geometric-free linear combination (see step s40 discussed with reference to FIG. 3) of all available ambiguity-reduced phase observations is processed to derive a common regional single layer ionosphere model (CRSLM) for all of the satellites. Features of this step include:

Processing within a region, defined for example by a spherical cap,

Use of satellite-to-satellite single-differenced ambiguity-reduced phase observations in the geometric-free linear combination (see step s51 discussed with reference to FIG. 4), Reduce the geometric-free, ambiguity-reduced phase observation by the geometric-free satellite phase bias received via said correction stream, Stabilize the ionosphere estimation by means of ionosphere pseudo-observations in a grid (such as for example a regular grid) inside the spherical cap. The pseudo-observations are not really observed (in terms of measurements), but computed from the global ionosphere model (therefore they are called "pseudo-observations") which is also provided via said correction stream.

Unknowns are the ASHA coefficients describing a regional ionosphere SLM.

By reducing the geometric-free phase observations with the resolved ambiguities and the satellite phase bias from the said correction stream, and neglecting noise and multipath errors, equation (7) leads to equation (8):

$$\tilde{L}_{GF} = \left(1 - \frac{\lambda_2^2}{\lambda_1^2}\right) \cdot I_1 + b_{GF}^s \quad (8)$$

Thus, the observation equation for the single differenced, geometric-free and ambiguity-reduced phase observations, reduced additionally by the satellite phase bias from said correction stream, is given by (9):

$$\nabla \tilde{L}_{GF}^{i,j} = \tilde{L}_{GF}^i - \tilde{L}_{GF}^j = \left(1 - \frac{\lambda_2^2}{\lambda_1^2}\right) \cdot I_{1,CRSLM}^i - \left(1 - \frac{\lambda_2^2}{\lambda_1^2}\right) \cdot I_{1,CRSLM}^j \quad (9)$$

Equation (9) is the satellite i to satellite j single differenced phase observation with reduced, i.e. with known and removed, ambiguities in the geometric-free linear combination. The satellite phase biases vanished due to reduction by values provided from said correction stream and the receiver ionospheric-phase bias is simply cancelled by the single difference. Thus, no receiver ionospheric-phase biases have to be set up in the data processing filter. Therefore, only the ASHA coefficients to compute $I_{1,SLM}$ at an arbitrary location are unknowns and the number of filter unknowns does not grow with the number of reference stations. Moreover, it is clear that the observations of equation (9) contain the differences of the ionospheric delays between two satellite links. Therefore, it is hard to derive the absolute level of the ionospheric delay by using equation (9) only. Hence, ionosphere pseudo-observations computed from the global ionosphere model are used additionally. These pseudo-observations are just a direct observation for the vertical ionosphere delay and its observation equation is given by equation (10):

$$I_{1,pseudoObs} = I_{1,global\,Model} \quad (10)$$

According to equation (11), a residual quantity $res_{GF}$ is computed by subtracting the estimated regional SLM from the geometric-free phase linear combination values which are additionally ambiguity resolved and further reduced by the satellite ionospheric-phase bias from said correction stream. In other words, the residual quantity (11) or $res_{GF}$ respectively is computed by subtracting the estimated regional SLM from the reduced observation given by equation (8).

$$res_{GF} = \tilde{L}_{GF} - I_{1,CRSLM} = \left(1 - \frac{\lambda_2^2}{\lambda_1^2}\right) \cdot I_1 + b_{GF}^r - I_{1,CRSLM} \quad (11)$$

Equation (11) shows that the receiver ionospheric-phase bias is still contained in the aforementioned residual quantity. This bias has to be removed to obtain the actual residuals $res_{SLM}$ of the SLM with respect to the true ionosphere:

$$res_{GF} = \quad (12)$$

$$\tilde{L}_{GF} - I_{1,CRSLM} = \left(1 - \frac{\lambda_2^2}{\lambda_1^2}\right) \cdot I_1 - I_{1,CRSLM} + b_{GF}^r = res_{CRSLM} + b_{GF}^r$$

3. Receiver Ionospheric-Phase Biases and Ionospheric Delay (See Steps s53 and s54 Discussed with Reference to FIG. 4)

An epoch estimate of the receiver ionospheric-phase bias (one bias per station and GNSS) can be computed by simply averaging the residual quantity $res_{GF}$ since the expected value for $res_{SLM}$ is zero. Within one epoch, a reference station can typically observe five to ten satellites per GNSS. Therefore, a good separation ("decorrelation") between the residuals $res_{SLM}$ and the receiver ionospheric-phase bias $b_{GF}^r$ is not possible with just a single epoch estimate; more samples are necessary to do so. Thus, the epoch estimates are filtered in a further processing step to derive a bias estimate which is more stable over time. For that purpose, the method holds a bank of one-state-filters. These filters basically realize an averaging of the epoch estimates. By removing the filtered receiver ionospheric-phase bias from equation (12), an estimate of the true ionosphere delay, Iono, of every receiver-satellite link can be computed by equations (13a) and (13b):

$$res_{GF} - b_{GF}^r = \quad (13a)$$

$$\tilde{L}_{GF} - I_{1,CRSLM} - b_{GF}^r = \left(1 - \frac{\lambda_2^2}{\lambda_1^2}\right) \cdot I_1 - I_{1,CRSLM} = res_{CRSLM}$$

$$Iono = \left(1 - \frac{\lambda_2^2}{\lambda_1^2}\right) \cdot I_1 = I_{1,CRSLM} + res_{CRSLM} \quad (13b)$$

The ionosphere delay, Iono, derived by equations (13a) and (13b) is affected by the noise and the systematic errors of the observations and the satellite and receiver phase biases. Therefore, the overall accuracy of the ionosphere delay, Iono, is in the range of a few centimeters.

4. Satellite Individual Ionosphere Models (See Step s55 Discussed with Reference to FIG. 4)

The ionosphere delays, Iono, are collected per satellite to derive satellite individual models. For every satellite, a surface, which is a function of latitude and longitude, describing the ionosphere delay inside the spherical cap is estimated. The functional model in this Least Squares step comprises ASHA functions, the set of ASHA coefficients of which is estimated. If the ambiguity resolution was successful, there is one ionosphere delay contributing to the ASHA estimation for every reference station. This means that, typically, the distribution of samples inside the cap is not homogeneous since the distribution of reference stations is typically not homogeneous inside the cap (see e.g. the map of FIG. 10: large areas within the cap are not covered by any reference stations, mainly due to the seas). To prevent the estimated coefficients from showing undesirable artefacts (i.e., large extrapolation errors in the unobserved regions) for this reason, pseudo-observations are used in a grid only for the unobserved regions. Within equation (13b), the residual $res_{CRSLM}$ is originally not available for a pseudo-observation. To nevertheless derive a reasonable value for $res_{CRSMP,pseudoObs}$, the existing residuals $res_{CRSLM}$ of the nearby stations are averaged. Afterwards, the whole cap is covered by real observations and pseudo-observations.

As already mentioned, the models are computed individually per satellite, i.e. for every satellite one model is computed. Therefore, there is no need to use an ionospheric single layer model (including the computation of pierce points and mapping functions) which is basically a simplified approach to process several satellites together in one common model. Thus, the ground coordinates of the reference stations transformed into the ASHA coordinate system ($\lambda_{ASHA}$ and $\varphi_{ASHA}$), can be used within the ASHA estimation. The ASHA models will not be estimated and available at the user receiver within the observation rate (1 second or shorter). Moreover, the models will be available with a certain time delay caused by data processing and model transmission. Thus, the epoch of ASHA model usage on the user receiver is later than the epoch of ASHA model estimation and there is always a need to predict the ionosphere based on the latest available ASHA model. The slant ionosphere delays, Iono, are therefore reduced to the vertical by an ionosphere mapping function as shown in equation (14) (see also FIG. 2 and equation (3)), before estimating the ASHA coefficients $C_{n,m}$ and $S_{n,m}$ by Least Squares (equation (15))—whereas the over-determined computation of the coefficients will also produce residuals $res_{ASHA}$. It should also be mentioned that the longitude and latitude ($\Lambda$ and $\Phi$) of the sphere or equation (4) respectively were replaced by the longitude and latitude of the ASHA coordinate system ($\lambda_{ASHA}$ and $\varphi_{ASHA}$).

$$Iono_{vertical} = Iono / mf_{iono} \quad (14)$$

$$res_{ASHA} = Iono_{vertical} - \sum_{n=0}^{N_{max}} \sum_{m=0}^{n} [(C_{n,m} \cdot \cos(m\lambda_{ASHA}) + S_{n,m} \cdot \sin(m\lambda_{ASHA})) \cdot P_{n,m(\varphi_{ASHA})}] \quad (15)$$

On the user receiver, the same type of mapping function is used and provides a slightly different value since, due to the above-discussed time delay caused by data processing and model transmission. With this usage of a vertical ionosphere delay (computed from the received ASHA model) multiplied by the mapping function value of the current epoch, the ionosphere delay is predicted on the user receiver.

In one embodiment, the computation of ASHA coefficients makes use of the ground coordinates of the reference stations transformed into the ASHA coordinate system ($\lambda_{ASHA}$ and $\varphi_{ASHA}$). Therefore, the spherical caps of the correction models are identical. This is advantageous for the development of a real-time message format since there is no need to transmit different cap parameters (latitude and longitude of the cap center). It allows furthermore the use of identical functional values from the Associated Legendre Polynomials of equation (4) on GNSS stations (this is true both for the estimation of model coefficients from the observations of the reference stations and also for the model usage at the user receiver). In other words, to compute the ionosphere delay from equation (4) based on transmitted ASHA coefficients $C_{n,m}$ and $S_{n,m}$, it is necessary to compute the value of the Associated Legendre Polynomials $P_{n,m}$ which are in turn functions of the latitude. Let us now assume that, at a certain point in time, fifteen satellites are observed by the user receiver and the ionosphere delay has to be computed for every pierce point since the latitude of every pierce point is different. Thus the functional value of the Associated Legendre Polynomials has to be computed fifteen times. Afterwards in the next observation epoch, which maybe a couple of seconds later, the position of those fifteen pierce points have slightly changed and the functional values of the Associated Legendre Polynomials have to be re-computed again. If the position of the user receiver is used instead of the positions of the pierce points, the situation is completely different, because the latitude is then constant and we can always use the value of the Associated Legendre Polynomials which was computed once from that latitude (transformed in to ASHA coordinate system, i.e. $\lambda_{ASHA}$) of the user receiver. Therefore, the computation of the delays and their accuracy information is sped up significantly by the usage of the ground coordinates of the GNSS station (transformed into the ASHA coordinate system, i.e. into $\lambda_{ASHA}$ and $\varphi_{ASHA}$).

The ASHA representation covers the whole spherical cap. It is a very efficient method to transmit the delay and the accuracy information of the ionosphere models to a user receiver. Quite large networks with a huge number of reference stations may require a relatively high ASHA resolution so that one set of coefficients may consist of about 50 to 100 coefficients. Message formats can be designed for this case so that a single satellite individual model can be transmitted within one message. This allows the messages to be interleaved with other PPP correction messages on low bandwidth links.

5. Accuracy Information for the Satellite Individual Ionosphere Models

Reference [5] describes an approach to derive accuracy information for a global ionosphere correction model based on GNSS parameter estimation residuals; i.e. the residuals are obtained from the computation of the GNSS parameter estimation which was done to determine a global ionosphere correction model. Within reference [5], the usage of a global SLM based on spherical harmonics is suggested to process the residuals of all satellites together in one common function, covering the whole globe. This function describes the accuracy of the before estimated global ionosphere correction model.

The residuals $res_{ASHA}$ of equation (15) are used in a similar approach to derive per-satellite accuracy information for every per-satellite ionosphere model (i.e. to derive per-satellite accuracy information for the per-satellite regional correction information). In contrast to the approach disclosed in reference [5], the method of the present embodiment is not applied globally but its application is limited to the region of interest whereas this region is defined by a spherical cap. Therefore the method uses ASHA instead of using global spherical harmonics. Moreover every Satellite is considered individually since per-satellite ionosphere correction models are estimated in step 4. Therefore there is no need for a common SLM to handle all satellites together in one model; i.e. the ground coordinates of the reference stations transformed into the ASHA coordinate system ($\lambda_{ASHA}$ and $\varphi_{ASHA}$) can be used again instead of pierce point coordinates. The final result of this regional application of the ionosphere accuracy indicator according to reference [5] is a second set of ASHA coefficients to describe the accuracy of the satellite individual ionosphere models inside the specified spherical cap.

Use of the Correction Information by, or for the Benefit of, the User Receivers, and Results In one embodiment, regional correction information (representing regional ionosphere correction models) is generated in real-time, and the correction information is transmitted to the user receivers—or to apparatus(es) in charge of processing observations from user receiver(s)—via a dedicated message format. On the apparatus making use of the correction information (i.e., user receiver or apparatus in charge of processing observations from user receiver(s)), global correction information (representing a global ionosphere model) as well as regional correction information (representing a regional ionosphere model) may be available. Both the global and regional correction information may be accompanied by accuracy indicating information (such as for example an accuracy indicator) as a measure of the accuracy of the ionosphere delay that the respective correction information conveys.

Based on the accuracy indicating information, the apparatus can select the more accurate ionosphere model (see steps s190/s200 on FIG. 8). When doing so, the regional correction information (representing regional ionosphere correction models) is expected to be almost always selected. The convergence time of the ambiguity determination approach and therefore also the convergence time of the position estimation is reduced thanks to the use of the regional correction information.

Figure 9:
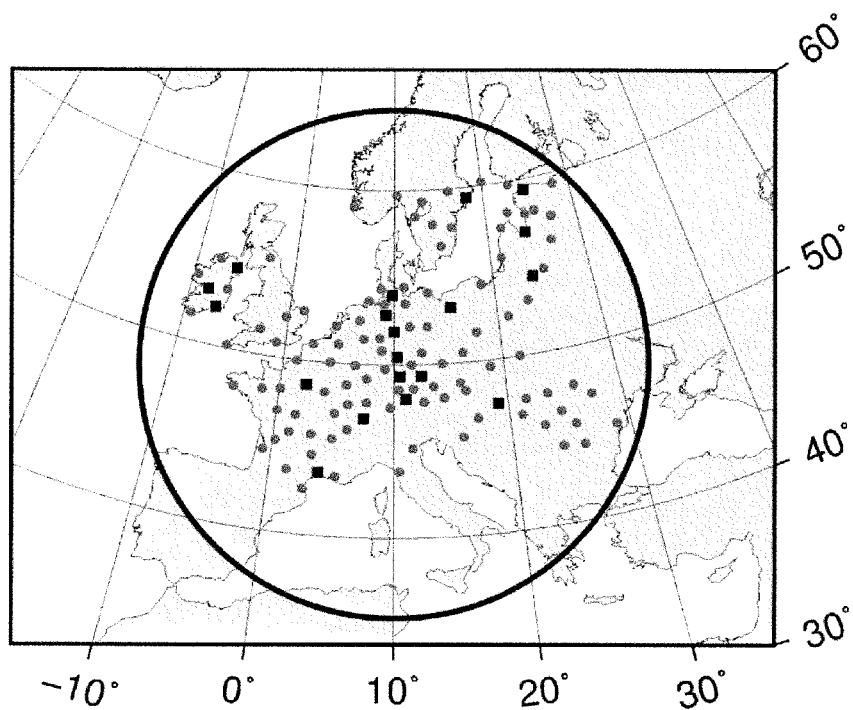
FIG. 9 schematically illustrates reference stations (grey dots) and test stations (black squares) within a spherical cap (black circle)
Figure 10:
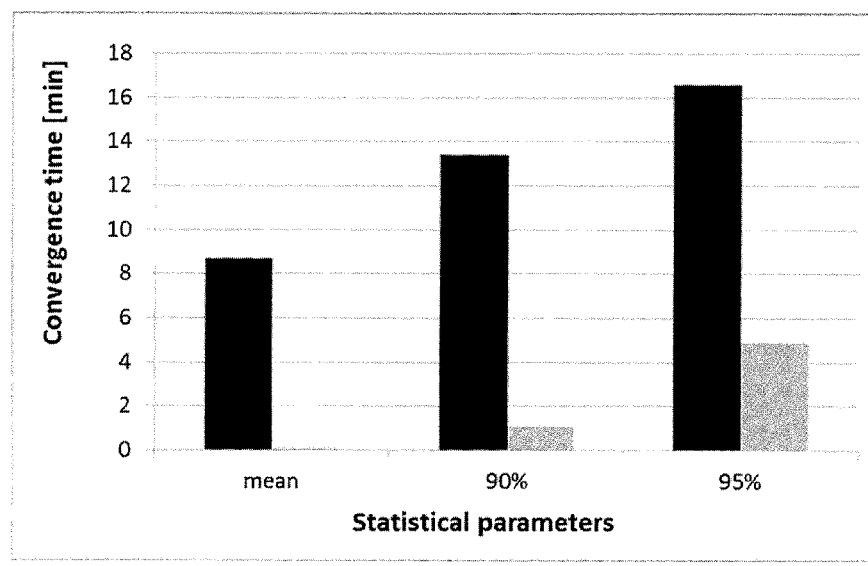
FIG. 10 exemplarily illustrates the comparison of the convergence times of test stations in Central Europe with (grey bars) and without (black bars) regional correction information.

For a network of reference stations located in central Europe, three 24-hour campaigns (one day in April, one day in May and one day in June 2014) were processed in an experimental setup. The regional network consisted of about 100 reference stations (see FIG. 9, wherein the reference stations are marked by grey dots). Their observations were used according the above described method to generate regional correction information (representing regional ionosphere correction models). The spherical cap, used to specify the region of interest, was defined by a central point of 10 degrees longitude (East) and 50 degrees latitude (North) and a cap radius of 15 degrees. This cap is marked by a black circle in FIG. 9. Both the global and the regional correction information and their accuracy indicating information were made available on 19 user receivers or test stations respectively (see FIG. 9, wherein the test stations are marked by black squares) to improve the ambiguity determination and, by doing so, to speed up the convergence time. The convergence time is the time which is elapsed until the estimated position is converged to a predetermined reference position. The general usage of ionosphere information on a NSS receiver and how and why it improves the ambiguity determination and the position estimation is explained in more detail in reference [5]. The estimated position for a test station of the campaigns was considered to be converged when the horizontal offset to the reference position is less than 1.5 inch (or 4 cm respectively). To investigate this convergence time, the receiver of the test stations were restarted every 30 minutes, i.e. the ambiguity determination and the position estimation started from scratch every 30 minutes. Finally, there were more than 2000 convergence runs (each for 30 minutes) available for statistical evaluation. Besides the above-described test setup (global and regional correction information available), a second test was done. That one was in general identical to the first one but only global correction information was used on the test stations. This test provided the statistical benchmark for the legacy or prior-art solution respectively. FIG. 10 shows the results of the statistical evaluation of the convergence times of the above-mentioned test stations in both above-mentioned test setups. The results of setup 1 (global and regional correction information available) are shown by grey bars whereas the results of setup 2 (global correction information available only) are shown by black bars. By introducing the regional correction information the mean convergence time decreased from about 9 minutes (black) to an instantaneous convergence, i.e. to a convergence with the first epoch. In other words, the average of all horizontal offsets from the reference positions in the first epoch is less than 1.5 inch (or 4 cm respectively). Also in the two percentile scenarios, the improvement is significant. E.g. the 95% percentile shows that, by applying regional correction information, the convergence time is shorter than 5 minutes in 95% of the test runs (grey bar). The corresponding convergence time is 17 minutes by applying global correction information only (black bar), i.e. the improvement for the 95% percentile is 12 minutes or 70% respectively. The described results confirm the expected improvement via experiment using real data exemplarily: The convergence times are reduced significantly by applying regional correction information.

Similar results, i.e. the reduction of the convergence time by about 70% compared to the global model in the 95% percentile, have been observed by similar convergence tests running over several months.

Thanks to the use of the ionospheric correction information, the convergence and positioning performance is almost comparable to the approach disclosed in references [7], [8] and [9] (GNSS signal processing with regional augmentation message). The required bandwidth (data volume) for transmitting the regional correction information (ASHA coefficients) is, however, much smaller than for the regional augmentation message of references [7], [8] and [9] (for regional networks with about 100 reference stations and more). The cost of broadcasting ionospheric correction information to NSS receivers via satellite signals, for example on L-band, and indeed the availability of such satellite links, is determined by the satellite service provider based on bandwidth usage. Thus such bandwidth reduction enables the ability to build and operate practical NSS positioning systems.

Apparatus

Figure 11:
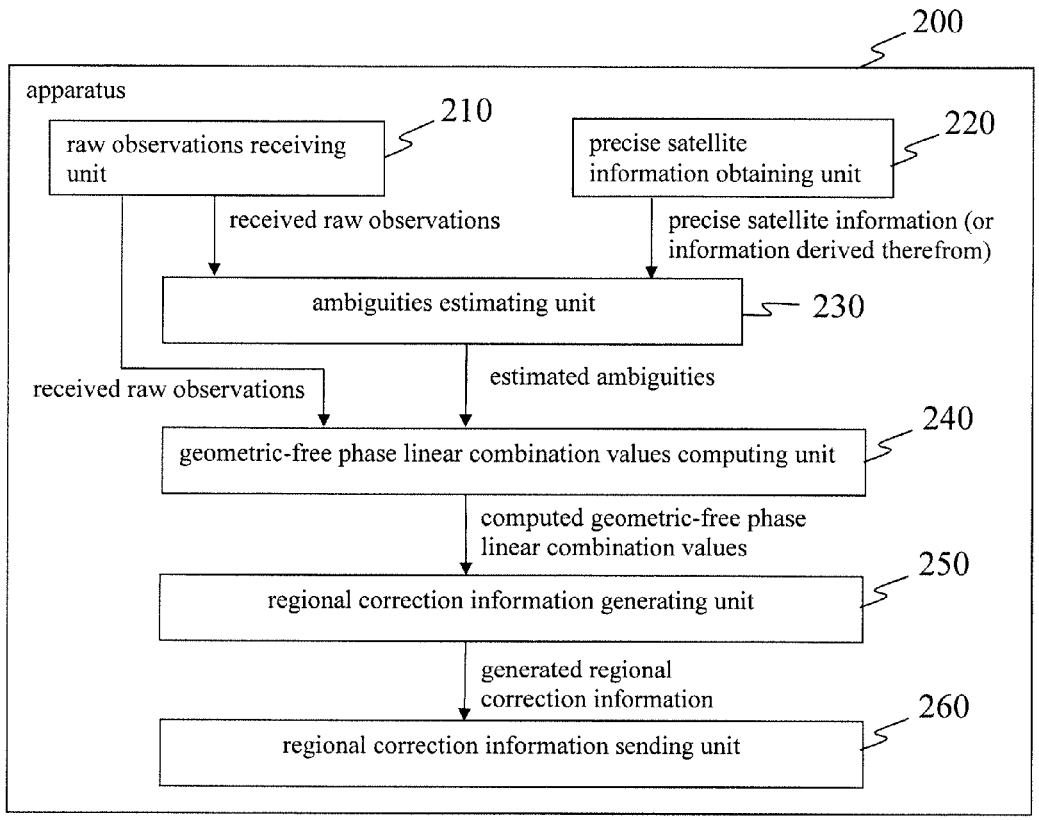
FIG. 11 schematically illustrates an apparatus, in one embodiment of the invention, for generating regional correction information, and for sending said correction information.

In one embodiment, schematically illustrated by FIG. 11, an apparatus 200 is provided for generating regional correction information to be used by, or for the benefit of, at least one NSS receiver. The NSS receiver(s) may be located, at one point in time, in a region of interest (under a region of the ionosphere).

Apparatus 200 comprises a first unit, herein referred to as "raw observations receiving unit" 210, a second unit, herein referred to as "precise satellite information obtaining unit" 220, a third unit, herein referred to as "ambiguities estimating unit" 230, a fourth unit, herein referred to as "geometric-free phase linear combination values computing unit" 240, a fifth unit, herein referred to as "regional correction information generating unit" 250, and a sixth unit, herein referred to as "regional correction information sending unit" 260.

Raw observations receiving unit 210 is configured for, for each of a plurality of reference stations in the region of interest, receiving raw observations obtained by the reference station observing NSS multiple-frequency signals from a plurality of NSS satellites over multiple epochs.

Precise satellite information obtaining unit 220 is configured for obtaining information (herein referred to as "precise satellite information"), on: (i) the orbit position of each one of the plurality of NSS satellites, (ii) a clock offset of each one of the plurality of NSS satellites, and (iii) a set of biases associated with each one of the plurality of NSS satellites; or is configured for obtaining information derived from the precise satellite information.

Ambiguities estimating unit 230 is configured for, for each of the plurality of reference stations, estimating ambiguities in the carrier phase of the received raw observations for the reference station, using (i) the precise satellite information (or the information derived therefrom), and (ii) the known position coordinates of the reference station.

Geometric-free phase linear combination values computing unit 240 is configured for computing geometric-free phase linear combination values based on the received raw observations together with the estimated ambiguities.

Regional correction information generating unit 250 is configured for generating the regional correction information, based on the computed geometric-free phase linear combination values, wherein the correction information comprises, for each of the plurality of NSS satellites, (i) at least one mathematical function ("regional ionospheric delay function"), and (ii) its coefficients ("regional ionospheric delay coefficients"). The regional ionospheric delay function(s) and its regional ionospheric delay coefficients represent, per NSS satellite, the ionospheric delay in the region of interest.

Regional correction information sending unit 260 is configured for sending the correction information to the at least one NSS receiver or to one or more apparatus in charge of processing observations from NSS receiver(s).

In other embodiments, apparatus 200 may comprise further units, sub-units and/or functionalities as previously discussed with reference to FIGS. 3 to 6 notably.

Figure 12:
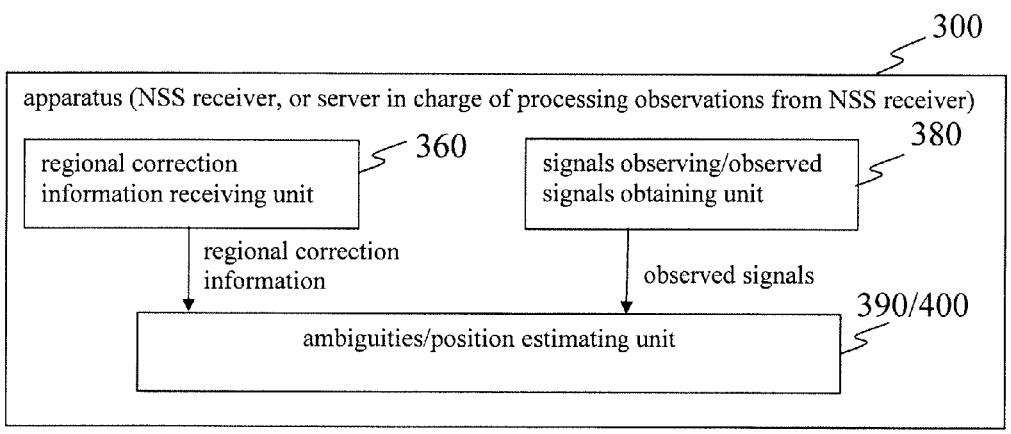
FIG. 12 schematically illustrates an apparatus making use of regional correction information, in one embodiment of the invention.

In one embodiment, schematically illustrated by FIG. 12, an apparatus 300, i.e. a navigation satellite system (NSS) receiver or a server in charge of processing observations from the NSS receiver, is configured to make use of the regional correction information. In particular, apparatus 300 comprises a first unit, herein referred to as "regional correction information receiving unit" 360, a second unit, herein referred to as "signals observing/observed signals obtaining unit" 380, and a third unit, herein referred to as "ambiguities/position estimating unit" 390/400.

Regional correction information receiving unit 360 is configured for receiving regional correction information, wherein said regional correction information comprises, for each of a plurality of NSS satellites, (i) at least one mathematical function ("regional ionospheric delay function") and (ii) its coefficients ("regional ionospheric delay coefficients"). As mentioned above, the regional ionospheric delay function(s) and its regional ionospheric delay coefficients represent, per NSS satellite, the ionospheric delay in a region of interest (under a region of the ionosphere).

Signals observing/observed signals obtaining unit 380 is configured for observing NSS multiple-frequency signals from the plurality of NSS satellites over multiple epochs, or is configured for obtaining such observed signals.

Ambiguities/position estimating unit 390/400 is configured for at least one of: (i) estimating ambiguities in the carrier phase of the observed signals using the received correction information, and (ii) estimating the position of the NSS receiver using the observed signals and the received correction information.

In other embodiments, apparatus 300 may comprise further units, sub-units and/or functionalities as previously discussed with reference notably to FIGS. 7 and 8.

Additional Remarks

Any of the above-described methods and their embodiments may be implemented, at least partially, by means of a computer program. The computer program may be loaded on an apparatus, such as for example a NSS receiver (running on a rover station or a reference station) or a server (which may comprise one or a plurality of computers). Therefore, the invention also relates to a computer program, which, when carried out on an apparatus as described above, such as for example a NSS receiver (running on a rover station or a reference station) or a server, carries out any one of the above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

NSS receivers may include an antenna, configured to receive the signals at the frequencies broadcasted by the satellites, processor units, one or more accurate clocks (such as crystal oscillators), one or more central processing units (CPU), one or more memory units (RAM, ROM, flash memory, or the like), and a display for displaying position information to a user.

Where the terms "raw observations receiving unit", "precise satellite information obtaining unit", "ambiguities estimating unit", "geometric-free phase linear combination values computing unit", "regional correction information generating unit", "regional correction information sending unit", "regional correction information receiving unit", "signals observing/observed signals obtaining unit", "ambiguities/position estimating unit", and the like are used herein as units (or sub-units) of an apparatus (such as a NSS receiver), no restriction is made regarding how distributed the constituent parts of a unit (or sub-unit) may be. That is, the constituent parts of a unit (or sub-unit) may be distributed in different software or hardware components or devices for bringing about the intended function. Furthermore, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Embodiment 17

Apparatus configured tor generating correction information, wherein the correction information comprises information for correcting observations useful for estimating at least one of phase ambiguities and a position of at least one global or regional navigation satellite system receiver, hereinafter abbreviated as NSS receiver, the NSS receiver being in a region of interest under a region of the ionosphere, the apparatus being configured for:

for each of a plurality of reference stations in the region of interest, receiving raw observations obtained by the reference station observing NSS multiple-frequency signals from a plurality of NSS satellites over multiple epochs;

obtaining information, hereinafter referred to as "precise satellite information", on:
the orbit position of each one of the plurality of NSS satellites,
a clock offset of each one of the plurality of NSS satellites, and
a set of biases associated with each one of the plurality of NSS satellites, or
information derived from the precise satellite information;

for each of the plurality of reference stations, estimating ambiguities in the carrier phase of the received raw observations for the reference station, using
the precise satellite information or the information derived from the precise satellite information, and
the known position coordinates of the reference station;

computing geometric-free phase linear combination values based on the received raw observations together with the estimated ambiguities;

generating the correction information, based on the computed geometric- free phase linear combination values, wherein the correction information comprises, for each of the plurality of NSS satellites,
at least one mathematical function, each of which being hereinafter referred to as "regional ionospheric delay function", and
its coefficients, hereinafter referred to as "regional ionospheric delay coefficients",
the at least one regional ionospheric delay function and its regional ionospheric delay coefficients representing, per NSS satellite, the ionospheric delay in the region of interest; and sending the generated correction information.

Embodiment 18

Apparatus, being a navigation satellite system receiver, hereinafter abbreviated as "NSS receiver", or a server in charge of processing observations from a NSS receiver, the apparatus being configured for:

receiving correction information, wherein the correction information comprises, for each of a plurality of NSS satellites,
at least one mathematical function, each of which being hereinafter referred to as "regional ionospheric delay function", and
its coefficients, hereinafter referred to as "regional ionospheric delay coefficients",
the at least one regional ionospheric delay function and its regional ionospheric delay coefficients representing, per NSS satellite, the ionospheric delay in a region of interest under a region of the ionosphere,
observing NSS multiple-frequency signals from the plurality of NSS satellites over multiple epochs, or obtaining such observed signals, and at least one of:

estimating ambiguities in the carrier phase of the observed signals using the received correction information, and estimating the position of the NSS receiver using the observed signals and the received correction information.

The invention also relates to the following embodiments numbered (i) to (xvi):

Embodiment (i)

Apparatus (200) of embodiment 17, further configured so that the at least one regional ionospheric delay function and its regional ionospheric delay coefficients represent, per NSS satellite, the slant ionospheric delay in the region of interest.

Embodiment (ii)

Apparatus (200) of embodiment 17, further configured so that the at least one regional ionospheric delay function and its regional ionospheric delay coefficients represent, per NSS satellite, the vertical ionospheric delay in the region of interest.

Embodiment (iii)

Apparatus (200) according to embodiment 17 or according to embodiment (i) or (ii), further configured so that generating (s50) the correction information based on the computed geometric-free phase linear combination values comprises:

computing (s51), based on the computed geometric-free phase linear combination values from which the satellite ionospheric-phase bias has been removed using the precise satellite information, satellite-to-satellite single-differenced combination values to cancel out the effects of the reference stations' receiver phase biases;

estimating (s52) an ionosphere single layer model common to the plurality of NSS satellites, said ionosphere single layer model being hereinafter referred to as "regional ionosphere single layer model", based on the computed satellite-to-satellite single-differenced combination values, wherein the regional ionosphere single layer model represents the vertical ionospheric delay in the region of interest;

estimating (s53) receiver ionospheric-phase biases for each reference station based on the differences between the computed geometric-free phase linear combination values from which the satellite ionospheric-phase bias has been removed using the precise satellite information, and the estimated regional ionosphere single layer model;

computing (s54) an ionospheric delay for each satellite-to-reference-station pair using the estimated receiver ionospheric-phase biases; and for each of the plurality of NSS satellites, determining (s55) a regional ionospheric delay function and its regional ionospheric delay coefficients based on the computed ionospheric delay, wherein the regional ionospheric delay function and its regional ionospheric delay coefficients represent the ionospheric delay for the satellite, so as to generate the correction information comprising the at least one regional ionospheric delay function and its regional ionospheric delay coefficients representing the ionospheric delay in the region of interest.

Embodiment (iv)

Apparatus (200) of embodiment (iii), further configured so that the plurality of NSS satellites belong to at least two navigation satellite systems, and
 estimating (s53) receiver ionospheric-phase biases comprises estimating receiver ionospheric-phase biases for each reference station and navigation satellite system.

Embodiment (v)

Apparatus (200) of embodiment (iii) or (iv), further configured so that generating (s50) the correction information based on the computed geometric-free phase linear combination values further comprises:
 for each of the plurality of NSS satellites, determining (s56) a mathematical function, hereinafter referred to as "regional accuracy indicating function", and its coefficients, hereinafter referred to as "regional accuracy indicating coefficients", based on the residuals of the regional ionospheric delay coefficients determination, wherein the regional accuracy indicating function and its regional accuracy indicating coefficients represent the vertical accuracy of the ionospheric delay.

Embodiment (vi)

Apparatus (200) according to any one of embodiments (iii) to (v), further configured so that determining (s55) the at least one regional ionosphere delay function and its regional ionospheric delay coefficients comprises:
 improving the at least one regional ionosphere delay function and its regional ionospheric delay coefficients using the regional ionosphere single layer model associated with points in areas within the region of interest which are not covered by computed geometric-free phase linear combination values.

Embodiment (vii)

Apparatus (200) according to embodiment 17 or according to any one of embodiments (i) to (vi), further configured so that the at least one regional ionospheric delay function is in the form of a spherical harmonics expansion.

Embodiment (viii)

Apparatus (200) according to embodiment 17 or according to any one of embodiments (i) to (vii), further configured so that the at least one regional ionospheric delay function is obtained by an Adjusted Spherical Cap Harmonics Analysis technique.

Embodiment (ix)

Apparatus (200) according to embodiment 17 or according to any one of embodiments (i) to (viii), wherein the aforementioned correction information is hereinafter referred to as "regional correction information",
 the apparatus (200) being further configured for receiving (s70) additional correction information, hereinafter referred to as "global correction information", wherein the global correction information comprises at least one mathematical function and its coefficients, the at least one mathematical function and its coefficients representing the ionospheric delay under the entire ionosphere.

Embodiment (x)

Apparatus (200) of embodiments (iii) and (ix), further configured so that estimating (s52) the regional ionosphere single layer model comprises:
 improving the regional ionosphere single layer model using the global correction information associated with points provided in a grid within the region of interest to provide an absolute level of the ionospheric delay to the regional ionosphere single layer model.

Embodiment (xi)

Apparatus (200) according to embodiment 17 or according to any one of embodiments (i) to (x), wherein the region of the ionosphere is a spherical cap.

Embodiment (xii)

Apparatus (200) according to embodiment 17 or according to any one of embodiments (i) to (xi), wherein the size of the region of the ionosphere comprises less than half of the ionosphere.

Embodiment (xiii)

Apparatus (300) of embodiment 18, wherein the aforementioned correction information is hereinafter referred to as "regional correction information", the apparatus (300) being further configured for:
 receiving (s170) additional correction information, hereinafter referred to as "global correction information", wherein the global correction information comprises
  at least one mathematical function, each of which being hereinafter referred to as "global ionospheric delay function", and
  its coefficients, hereinafter referred to as "global ionospheric delay coefficients",
  the at least one global ionospheric delay function and its global ionospheric delay coefficients representing the ionospheric delay under the entire ionosphere; and
 wherein at least one of
  estimating (s190) ambiguities in the carrier phase of the observed signals, and
  estimating (s200) the position of the NSS receiver using the observed signals
  makes use, per NSS satellite, of either the regional correction information or the global correction information.

Embodiment (xiv)

Apparatus (300) of embodiment (xiii), further configured so that
 the regional correction information further comprises, for each of the plurality of NSS satellites, a mathematical function, hereinafter referred to as "regional accuracy indicating function", and its coefficients, hereinafter referred to as "regional accuracy indicating coefficients", wherein the regional accuracy indicating function and its regional accuracy indicating coefficients represent the vertical accuracy of the ionospheric delay represented by the at least one regional ionospheric delay function and its regional ionospheric delay coefficients;
 the global correction information further comprises at least one mathematical function, hereinafter referred to as "global accuracy indicating function", and its coefficients, hereinafter referred to as "global accuracy indicating coefficients", wherein the global accuracy indicating function and its global accuracy indicating coefficients represent the vertical accuracy of the ionospheric delay represented by the at least one global ionospheric delay function and its global ionospheric delay coefficients; and at least one of
- estimating (s190) ambiguities in the carrier phase of the observed signals, and
- estimating (s200) the position of the NSS receiver using the observed signals comprises determining which one of the regional correction information and the global correction information is more accurate by at least comparing the regional accuracy indicating function taking into account its regional accuracy indicating coefficients to the global accuracy indicating function taking into account its global accuracy indicating coefficients, and making use of the more accurate of the regional correction information and the global correction information.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method, carried out by a computer or set of computers, for generating correction information, wherein the correction information comprises information for correcting observations useful for estimating at least one of phase ambiguities and a position of at least one global or regional navigation satellite system receiver, hereinafter abbreviated as NSS receiver, the NSS receiver being in a region of interest under a region of the ionosphere, the method comprising:

for each of a plurality of reference stations in the region of interest, receiving raw observations obtained by the reference station observing NSS multiple-frequency signals from a plurality of NSS satellites over multiple epochs;

obtaining information, hereinafter referred to as "precise satellite information", on:
  the orbit position of each one of the plurality of NSS satellites,
  a clock offset of each one of the plurality of NSS satellites, and
  a set of biases associated with each one of the plurality of NSS satellites, or information derived from the precise satellite information;

for each of the plurality of reference stations, estimating ambiguities in the carrier phase of the received raw observations for the reference station, using:
  the precise satellite information or the information derived from the precise satellite information, and
  the known position coordinates of the reference station;

computing geometric-free phase linear combination values based on the received raw observations together with the estimated ambiguities;

generating the correction information, based on the computed geometric-free phase linear combination values, wherein the correction information comprises, for each of the plurality of NSS satellites;

at least one mathematical function, each of which being hereinafter referred to as "regional ionospheric delay function", and coefficients of the regional ionospheric delay function, hereinafter referred to as "regional ionospheric delay coefficients", the at least one regional ionospheric delay function and the regional ionospheric delay coefficients representing, per NSS satellite, the ionospheric delay in the region of interest; and sending the generated correction information.

2. Method of claim 1, wherein the at least one regional ionospheric delay function and the regional ionospheric delay coefficients represent, per NSS satellite, the slant ionospheric delay in the region of interest.

3. Method of claim 1, wherein the at least one regional ionospheric delay function and the regional ionospheric delay coefficients represent, per NSS satellite, the vertical ionospheric delay in the region of interest.

4. Method of claim 1, wherein the step of generating the correction information based on the computed geometric-free phase linear combination values comprises:

computing, based on the computed geometric-free phase linear combination values from which the satellite ionospheric-phase bias has been removed using the precise satellite information, satellite-to-satellite single-differenced combination values to cancel out the effects of the reference stations' receiver phase biases;

estimating an ionosphere single layer model common to the plurality of NSS satellites, said ionosphere single layer model being hereinafter referred to as "regional ionosphere single layer model", based on the computed satellite-to-satellite single-differenced combination values, wherein the regional ionosphere single layer model represents the vertical ionospheric delay in the region of interest;

estimating receiver ionospheric-phase biases for each reference station based on the differences between the computed geometric-free phase linear combination values from which the satellite ionospheric-phase bias has been removed using the precise satellite information, and the estimated regional ionosphere single layer model;

computing an ionospheric delay for each satellite-to-reference-station pair using the estimated receiver ionospheric-phase biases; and for each of the plurality of NSS satellites, determining a regional ionospheric delay function and the regional ionospheric delay coefficients based on the computed ionospheric delay, wherein the regional ionospheric delay function and the regional ionospheric delay coefficients represent the ionospheric delay for the satellite, so as to generate the correction information comprising the at least one regional ionospheric delay function and the regional ionospheric delay coefficients representing the ionospheric delay in the region of interest.

5. Method of claim 4, wherein the plurality of NSS satellites belong to at least two navigation satellite systems, and the step of estimating receiver ionospheric-phase biases comprises estimating receiver ionospheric-phase biases for each reference station and navigation satellite system.

6. Method of claim 4, wherein the step of generating the correction information based on the computed geometric-free phase linear combination values further comprises:

for each of the plurality of NSS satellites, determining a mathematical function, hereinafter referred to as "regional accuracy indicating function", and coefficients of the regional accuracy indicating function, hereinafter referred to as "regional accuracy indicating coefficients", based on the residuals of the regional ionospheric delay coefficients determination, wherein the regional accuracy indicating function and the regional accuracy indicating coefficients represent the vertical accuracy of the ionospheric delay.

7. Method of claim 4, wherein the step of determining the at least one regional ionosphere delay function and the regional ionospheric delay coefficients comprises:
improving the at least one regional ionosphere delay function and the regional ionospheric delay coefficients using the regional ionosphere single layer model associated with points in areas within the region of interest which are not covered by computed geometric-free phase linear combination values.

8. Method of claim 4, wherein the step of estimating the regional ionosphere single layer model comprises:
improving the regional ionosphere single layer model using the global correction information associated with points provided in a grid within the region of interest to provide an absolute level of the ionospheric delay to the regional ionosphere single layer model.

9. Method of claim 1, wherein the at least one regional ionospheric delay function is in the form of a spherical harmonics expansion.

10. Method of claim 1, wherein the at least one regional ionospheric delay function is obtained by an Adjusted Spherical Cap Harmonics Analysis technique.

11. Method of claim 1, wherein the aforementioned correction information is hereinafter referred to as "regional correction information", the method further comprising receiving additional correction information, hereinafter referred to as "global correction information", wherein the global correction information comprises at least one mathematical function and associated coefficients, the at least one mathematical function and the associated coefficients representing the ionospheric delay under the entire ionosphere.

12. Method of claim 1, wherein the region of the ionosphere is a spherical cap.

13. Method of claim 1, wherein the size of the region of the ionosphere comprises less than half of the ionosphere.

14. Computer program comprising instructions configured, when executed on a computer, to carry out a method according to claim 1.

15. Method carried out by a global or regional navigation satellite system receiver, hereinafter abbreviated as NSS receiver, or by an apparatus in charge of processing observations from a NSS receiver, the method comprising:
receiving regional correction information, wherein the regional correction information comprises, for each of a plurality of NSS satellites:
at least one mathematical function, each of which being hereinafter referred to as "regional ionospheric delay function",
coefficients of the regional ionospheric delay function, hereinafter referred to as "regional ionospheric delay coefficients",
a mathematical function, hereinafter referred to as "regional accuracy indicating function", and
coefficients of the regional accuracy indicating function, hereinafter referred to as "regional accuracy indicating coefficients",
the at least one regional ionospheric delay function and the regional ionospheric delay coefficients representing, per NSS satellite, the ionospheric delay in a region of interest under a region of the ionosphere;
the regional accuracy indicating function and the regional accuracy indicating coefficients representing the vertical accuracy of the ionospheric delay represented by the at least one regional ionospheric delay function and the regional ionospheric delay coefficients;
receiving global correction information, wherein the global correction information comprises:
at least one mathematical function, each of which being hereinafter referred to as "global ionospheric delay function",
coefficients of the global ionospheric delay function, hereinafter referred to as "global ionospheric delay coefficients",
a mathematical function, hereinafter referred to as "global accuracy indicating function", and
coefficients of the global accuracy indicating function, hereinafter referred to as "global accuracy indicating coefficients",
the at least one global ionospheric delay function and the global ionospheric delay coefficients representing the ionospheric delay under the entire ionosphere;
the global accuracy indicating function and the global accuracy indicating coefficients representing the vertical accuracy of the ionospheric delay represented by the at least one global ionospheric delay function and the global ionospheric delay coefficients; and
observing NSS multiple-frequency signals from the plurality of NSS satellites over multiple epochs, or obtaining such observed signals;
wherein at least one of:
estimating ambiguities in the carrier phase of the observed signals using the received regional correction information or the global correction information, and
estimating the position of the NSS receiver using the observed signals and the received regional correction information or the global correction information,
wherein at least one of:
the step of estimating ambiguities in the carrier phase of the observed signals, and
the step of estimating the position of the NSS receiver using the observed signals,
comprises determining which one of the regional correction information and the global correction information is more accurate by at least comparing the regional accuracy indicating function taking into account the regional accuracy indicating coefficients to the global accuracy indicating function taking into account the global accuracy indicating coefficients, and making use of the more accurate of the regional correction information and the global correction information.

16. System configured for generating correction information, wherein the correction information comprises information for correcting observations useful for estimating at least one of phase ambiguities and a position of at least one global or regional navigation satellite system receiver, hereinafter abbreviated as NSS receiver, the NSS receiver being in a region of interest under a region of the ionosphere, the system comprising;
an apparatus being configured for:
for each of a plurality of reference stations in the region of interest, receiving raw observations obtained by the reference station observing NSS multiple-frequency signals from a plurality of NSS satellites over multiple epochs;
obtaining information, hereinafter referred to as "precise satellite information", on:

the orbit position of each one of the plurality of NSS satellites, a clock offset of each one of the plurality of NSS satellites, and a set of biases associated with each one of the plurality of NSS satellites, or information derived from the precise satellite information;

for each of the plurality of reference stations, estimating ambiguities in the carrier phase of the received raw observations for the reference station, using:

the precise satellite information or the information derived from the precise satellite information, and the known position coordinates of the reference station;

computing geometric-free phase linear combination values based on the received raw observations together with the estimated ambiguities;

generating the correction information, based on the computed geometric-free phase linear combination values, wherein the correction information comprises, for each of the plurality of NSS satellites;

at least one mathematical function, each of which being hereinafter referred to as "regional ionospheric delay function", and coefficients of the regional ionospheric delay function, hereinafter referred to as "regional ionospheric delay coefficients", the at least one regional ionospheric delay function and the regional ionospheric delay coefficients representing, per NSS satellite, the ionospheric delay in the region of interest; and sending the generated correction information.

17. Apparatus, being a navigation satellite system receiver, hereinafter abbreviated as "NSS receiver", or a server in charge of processing observations from a NSS receiver, the apparatus comprising:

a module being configured for:

receiving regional correction information, wherein the regional correction information comprises, for each of a plurality of NSS satellites:

at least one mathematical function, each of which being hereinafter referred to as "regional ionospheric delay function", coefficients of the regional ionospheric delay function, hereinafter referred to as "regional ionospheric delay coefficients", a mathematical function, hereinafter referred to as "regional accuracy indicating function", and coefficients of the regional accuracy indicating function, hereinafter referred to as "regional accuracy indicating coefficients", the at least one regional ionospheric delay function and the regional ionospheric delay coefficients representing, per NSS satellite, the ionospheric delay in a region of interest under a region of the ionosphere;

the regional accuracy indicating function and the regional accuracy indicating coefficients representing the vertical accuracy of the ionospheric delay represented by the at least one regional ionospheric delay function and the regional ionospheric delay coefficients;

receiving global correction information, wherein the global correction information comprises:

at least one mathematical function, each of which being hereinafter referred to as "global ionospheric delay function", coefficients of the global ionospheric delay function, hereinafter referred to as "global ionospheric delay coefficients", a mathematical function, hereinafter referred to as "global accuracy indicating function", and coefficients of the global accuracy indicating function, hereinafter referred to as "global accuracy indicating coefficients", the at least one global ionospheric delay function and the global ionospheric delay coefficients representing the ionospheric delay under the entire ionosphere;

the global accuracy indicating function and the global accuracy indicating coefficients representing the vertical accuracy of the ionospheric delay represented by the at least one global ionospheric delay function and the global ionospheric delay coefficients; and observing NSS multiple-frequency signals from the plurality of NSS satellites over multiple epochs, or obtaining such observed signals;

wherein at least one of:

estimating ambiguities in the carrier phase of the observed signals using the received regional correction information or the global correction information, and estimating the position of the NSS receiver using the observed signals and the received regional correction information or the global correction information, wherein at least one of:

the step of estimating ambiguities in the carrier phase of the observed signals, and the step of estimating the position of the NSS receiver using the observed signals, comprises determining which one of the regional correction information and the global correction information is more accurate by at least comparing the regional accuracy indicating function taking into account the regional accuracy indicating coefficients to the global accuracy indicating function taking into account the global accuracy indicating coefficients, and making use of the more accurate of the regional correction information and the global correction information.

* * * * *